US012207049B2

(12) United States Patent
Corynen

(10) Patent No.: US 12,207,049 B2
(45) Date of Patent: Jan. 21, 2025

(54) HEADREST MOUNTED LOUDSPEAKER FOR PRODUCING SOUND AT BASE FREQUENCIES

(71) Applicant: PSS BELGIUM NV, Dendermonde (BE)

(72) Inventor: David Corynen, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 208 days.

(21) Appl. No.: 17/999,147

(22) PCT Filed: Jun. 2, 2021

(86) PCT No.: PCT/EP2021/064765

§ 371 (c)(1),
(2) Date: Nov. 17, 2022

(87) PCT Pub. No.: WO2021/249843

PCT Pub. Date: Dec. 16, 2021

(65) Prior Publication Data

US 2023/0199377 A1 Jun. 22, 2023

(30) Foreign Application Priority Data

Jun. 9, 2020 (GB) ...................................... 2008724

(51) Int. Cl.
*H04R 1/34* (2006.01)
*H04R 1/02* (2006.01)
(Continued)

(52) U.S. Cl.
CPC ............. *H04R 1/347* (2013.01); *H04R 1/025* (2013.01); *H04R 1/288* (2013.01); *H04R 7/12* (2013.01);
(Continued)

(58) Field of Classification Search
CPC ........ H04R 1/347; H04R 1/025; H04R 1/288; H04R 7/12; H04R 7/18; H04R 2400/11; H04R 2499/13
See application file for complete search history.

(56) References Cited

U.S. PATENT DOCUMENTS

| | | | | |
|---|---|---|---|---|
| 4,075,438 A * | 2/1978 | Kappel | H04R 5/023 381/301 |
| 5,889,875 A * | 3/1999 | Caron | A47C 7/727 381/345 |
| 2002/0018576 A1* | 2/2002 | Shima | H04R 1/025 381/396 |

FOREIGN PATENT DOCUMENTS

| | | | | |
|---|---|---|---|---|
| DE | 102018213954 A1 * | 2/2020 | G10K 11/1783 |
| EP | 1077583 A2 * | 2/2001 | H04R 1/345 |

(Continued)

OTHER PUBLICATIONS

UKIPO, Search Report for corresponding GB Patent Application No. GB2008724.3, mailed Nov. 10, 2020, 3 pages.

(Continued)

*Primary Examiner* — Oyesola C Ojo
(74) *Attorney, Agent, or Firm* — NK Patent Law

(57) ABSTRACT

There is provided a headrest housing a dipole loudspeaker for producing sound at bass frequencies in a forward direction and in a rear direction, a response 180 degrees out of phase from respective front and rear resonating surfaces. The headrest includes a waveguide formation to isolate sound from travelling through the headrest between the front surface and the rear surface. The headrest also includes an attachment formation, and the attachment formation suspends the first frame of the dipole loudspeaker and acts as a secondary suspension system. By including waveguide formations, the sound from the front surface of the dipole speaker can be guided outside of the headrest, wherein the
(Continued)

shortest path from the front surface to the back surface is extended to be around the outside of the headrest. Guiding the sound path to be external to the headrest, prevents internal sound guiding compressing the intended path length.

14 Claims, 12 Drawing Sheets

(51) Int. Cl.
*H04R 1/28* (2006.01)
*H04R 7/12* (2006.01)
*H04R 7/18* (2006.01)

(52) U.S. Cl.
CPC ............ *H04R 7/18* (2013.01); *H04R 2400/11* (2013.01); *H04R 2499/13* (2013.01)

(56) References Cited

FOREIGN PATENT DOCUMENTS

| | | | | |
|---|---|---|---|---|
| JP | 2017022604 A | * 1/2017 | ............... | H04R 1/26 |
| WO | 2019121266 A1 | 6/2019 | | |
| WO | 2019192808 A1 | 10/2019 | | |

OTHER PUBLICATIONS

ISA/EP, International Search Report and Written Opinion for corresponding PCT Patent Application No. PCT/EP2021/064765, mailed Sep. 13, 2021, 21 pages.

* cited by examiner

Mms: 10g
Bl: 2.5Tm
Kms: 0,63N/mm
Ml: 250g
Ks2: 1N/mm

Mms: 10g
Bl: 2.5Tm
Kms: 0,63N/mm
Ml: 250g
Ks2: 4N/mm

HEADREST MOUNTED LOUDSPEAKER FOR PRODUCING SOUND AT BASE FREQUENCIES

CROSS REFERENCE TO RELATED APPLICATIONS

This application is a U.S. National Stage Application of International Patent Application No. PCT/EP2021/064765 entitled "HEADREST MOUNTED LOUDSPEAKER FOR PRODUCING SOUND AT BASE FREQUENCIES", filed 2 Jun. 2021, which claims priority to GB2008724.3 entitled "HEADREST MOUNTED LOUDSPEAKER FOR PRODUCING SOUND AT BASE FREQUENCIES", filed 9 Jun. 2020, the entire contents and elements of all of which are herein incorporated by reference for all purposes.

FIELD OF THE INVENTION

The present invention relates to a loudspeaker for producing base frequencies when mounted in a headrest to provide a personal sound cocoon, and particularly, although not exclusively, to an audio system comprising a headrest and a dipole loudspeaker mounted therein, wherein the dipole loud speaker projects sound at base frequencies in a forward direction and, in a second direction, a response 180 degrees out of phase.

BACKGROUND

Recently, various efforts have been made to provide an audio system for producing a personal sound cocoon. Here, a personal sound cocoon is a region in which a user is able to experience sound having a sound pressure level (SPL) deemed to be acceptably high for their enjoyment, whereas outside the personal sound cocoon, the sound is deemed to have an SPL which is much lower than it is within the volume defined by the personal sound cocoon.

The use of highly directive loudspeakers positioned close to a location where a listener is likely to position their head is an effective solution for medium and high frequencies. However, it is generally impractical in most situations to make a loudspeaker directive at bass frequencies, since in order to provide a highly directive loudspeaker for base frequencies, the dimensions of the radiating surface must be of the same order as the wavelength, and wavelengths are typically very long for base frequency content. For instance, a typical base frequency content has a wavelength of 3.4 m for 100 Hz frequency.

WO 2019/121266 discloses a dipole loudspeaker for producing sound at bass frequencies and that is particularly suitable for an audio system designed to produce a personal sound cocoon. Here, the dipole loudspeaker provides a personal loudspeaker that is created by using the sound created by a first radiating surface of the dipole loudspeaker to interfere with the sound produced by a second radiating surface of the dipole loudspeaker. It is envisaged the first radiating surface and second radiating surface will be front and back surfaces of a diaphragm, wherein the two sounds are produced in antiphase. The interference is disclosed as creating beneficial effects in effectively cancelling out sound that travels outside of the personal sound cocoon and where the two sounds in antiphase meet. The operation and construction of the dipole loudspeaker disclosed in WO 2019/121266 is specifically incorporated herein by reference, and a detailed explanation is therefore omitted. But briefly, the dipole loudspeaker comprises the diaphragm having first and second radiating surfaces suspended to a first frame via primary suspension elements. The first frame is in turn suspended to a second frame via secondary suspension elements. The second frame can then be rigidly fixed in the headrest. Suitable suspension elements for the primary and secondary suspension elements are known such as a roll suspension, a metal spring or a rubber band.

An audio system incorporating the dipole loudspeaker disclosed in WO 2019/121266 for producing bass frequencies (e.g. in the range of 20 Hz to 2000 Hz), can be incorporated in to a headrest to provide a personal sound cocoon forming a volume near to the headrest and in which a listener is intended to rest their head. Such a headrest may find applications in a wide range of audio applications, for instance automotive, aviation, gaming, studio monitoring, home entertainment, and others. Also, in noisy environments, the headrest could be used for noise cancelling at base frequencies.

In developing such headrests, it is an aim to further improve the implementation and mounting of the dipole loudspeaker in order to produce a personal sound cocoon having increased SPL in the volume of the personal sound cocoon and, additionally or alternatively, a reduced SPL outside of the personal sound cocoon. It is a further aim to limit the transmission of vibrations from the dipole loudspeaker through the headrest and connected seat.

The present invention has been devised in light of the above or other considerations.

SUMMARY OF THE INVENTION

According to the exemplary embodiments, there is provided a headrest housing a dipole loudspeaker wherein the headrest includes a waveguide formation to isolate sound from travelling through the headrest between the front surface and the rear surface. Here, it has been found that if the dipole loudspeaker is suspended within the headrest in a manner that provides open spaces through which sound can travel, portions of the headrest that are acoustically non-transmissive, that is that have acoustic resistance to prevent or substantially prevent sound from travelling through the portion, can act to guide the sound and shorten the path length, which reduces the effective output of the loudspeaker.

That is, without providing the waveguide formations, sound openings through the headrest between the front and back surfaces of the dipole's diaphragm can provide a cavity in the headrest through which sound can be guided, resulting in reduced efficiency of the loudspeaker due to a partial enhanced acoustic short circuit. Advantageously, by including waveguide formations, the sound from the front surface can be guided outside of the headrest, wherein the shortest path from the front surface to the back surface is extended to be around the outside of the headrest. Guiding the sound path to be external to the headrest, prevents internal sound guiding compressing the intended path length.

Herein, acoustic resistive materials may have a Specific Airflow Resistance (Rs) higher than 30 Pa·s/m or more preferred higher than 60 Pa·s/m. Suitably, the acoustically resistive material is a suitable foam. Where used, an acoustically transmissive material or acoustically transparent material may be a material with a specific airflow resistance (Rs) lower than 20 Pa·s/m and more preferably lower than 10 Pa·s/m.

Also, according to the exemplary embodiments, there is provided a headrest housing a dipole loudspeaker wherein the headrest includes an attachment formation, and the attachment formation suspends the first frame of the dipole loudspeaker and acts as a secondary suspension system. Here, the dipole loudspeaker comprises a diaphragm providing a first radiating surface (which may suitably be the front surface) and a second radiating surface (which may be the back surface). The diaphragm is suspended to the first frame via a primary suspension system. Here, rather than the first frame being suspended to a second frame via secondary suspension system with the second frame being rigidly attached to the headrest, the first frame is suspended directly from the headrest. In particular, the attachment formations can be integral to a structure of the headrest. Advantageously, with the structure of the headrest being formed from a resilient material to provide comfort to the listener, the attachment formations can be integrally formed from the resilient material with the resilient nature of the material providing the suspension to the first frame. Also, by removing the second frame and secondary suspension system from the dipole loudspeaker, the number of parts of the dipole loudspeaker can be reduced. Since the structure of the headrest is required for the function of providing a headrest (that is the function of providing a rest for the head), there is no or limited increased complexity or cost in combining the function of the headrest's structure with the function of the secondary suspension system.

In particular suitable exemplary embodiments, there is provided a headrest housing a dipole loudspeaker wherein the headrest includes an attachment formation for suspending the first frame of the dipole loudspeaker and the attachment formation also functions as a waveguide formation to isolate sound from travelling through the headrest between the front surface and the rear surface.

The exemplary embodiments provide an audio system comprising the headrest and the dipole loudspeaker. Whilst in some exemplary embodiments, the headrest is formed as a separate headrest that is attachable to a chair back for forming a seat or chair or the like, it is envisaged the headrest may also be integral to the seat back. Moreover, it is envisaged the headrest may take the form of any structure against which a listener is intended or encouraged to rest their head. For instance, typically a headrest is a dedicated structure arranged at a location at which a listener's head is likely to be positioned. The user's head may rest against the structure or at least be positioned in proximity thereto when the listener is positioned to perform an activity. Thus, the headrest may take the form of a traditional seat headrest, but may also be other suitable structures that a user's head is intended to be positioned in proximity thereto. By way of example, suitably, in the exemplary embodiments, the headrest is configured for use with a seat. Here, the seat is configured to position a user (also referred to as a listener) who is sat down in the seat such that an ear of the user is located at a listening position relative to the dipole loudspeaker. It will be appreciated that the headrest is therefore optimally arranged relative to the seat as may be known in the art. Here, the listening position is a position wherein the ear (preferably each ear of a user is located at a respective listening position) that is 40 cm or less (more preferably 30 cm or less, more preferably 25 cm or less, more preferably 20 cm or less, more preferably 15 cm or less) from the first radiating surface of the loudspeaker. It will be appreciated that since headrests are generally configured to position a user who is sat down in the seat such that an ear of the user is located at a listening position that is a small distance (e.g. 30 cm or less) from the first radiating surface of the loudspeaker, an external shape and configuration of the headrest may be configured as is known in the art. Here a seat headrest typically has a front surface configured to face towards the head of a user sat in the seat, and a back surface configured to face away from the head of a user sat in the seat. The loudspeaker is preferably mounted within the headrest of the seat e.g. with the first radiating surface of the loudspeaker facing the front surface of the headrest, e.g. with a principal axis of the first radiating surface extending out through the front surface of the headrest.

The dipole loudspeaker of the exemplary embodiments is configured to produce sound at bass frequencies. Here, the dipole loudspeaker includes a drive unit configured to move the diaphragm at bass frequencies. The drive unit is therefore suitably configured to move the diaphragm across a range of bass frequencies. For instance the range of bass frequencies may be a range of 60-80 Hz, more preferably the range may be 50-100 Hz, more preferably the range may be 40-100 Hz, and may include frequencies across the range 40-160 Hz. At these frequencies, the loudspeaker is able to produce a particularly useful personal sound cocoon.

Moving the diaphragm at frequencies below 40 Hz may be useful for some applications, but not for others (such as in a car, where below 40 Hz background noise tends to be too loud). Above 160 Hz, the "cocooning" effect may be depleted. Therefore, the drive unit may be configured to move the diaphragm at frequencies that do not exceed 250 Hz, 200 Hz, or even 160 Hz. This may help to ensure the loudspeaker achieves a suitable SPL within the personal sound cocoon as well as a suitable SPL external thereto.

In view of the above considerations, the dipole loudspeaker is preferably configured as a subwoofer. A subwoofer can be understood as a loudspeaker dedicated to (rather than suitable for) producing sound at bass frequencies.

In view of considerations explained in more detail in WO 2019/121266, the first and/or second radiating surfaces of the diaphragm may each have a relatively large surface area. For instance, in the exemplary embodiments, the dipole loudspeaker has a diaphragm having first and second radiating surfaces having areas of at least 100 $cm^2$, more preferably at least 150 $cm^2$, more preferably at least 200 $cm^2$, more preferably at least 250 $cm^2$. In some cases, the first and/or second radiating surfaces may each have a surface area of at least 300 $cm^2$, or at least 400 $cm^2$. In order to maximize the surface area of the first and second radiating surfaces within other design constraints (e.g. incorporating the loudspeaker into the car headrest), the diaphragm may have a noncircular shape, (e.g. a rectangular or square shape). Thus, in the exemplary embodiments, it is envisaged the diaphragm and therefore the first and second radiating surfaces could be circular, rectangular, rectangular with rounded corners, or indeed have a more freeform shape.

The dipole loudspeaker of the exemplary embodiments is configured to suspend a diaphragm from a frame via a primary suspension system. Because the dipole loudspeaker is configured to be suspended directly from the headrest by a secondary suspension system, the dipole loudspeaker includes only the first frame of the dipole loudspeaker disclosed in WO 2019/121266. Thus, herein, the first frame is referred to as 'the frame' for simplicity. Moreover, in the context of this disclosure, the frame is intended to encompass any substantially rigid structure from which the diaphragm can be suspended. By way of example, the frame from which the diaphragm is suspended may include one or more mounting legs which extend into one or more (respective) cavities in the diaphragm, wherein the diaphragm is suspended from the one or more mounting legs via one or more suspension elements of the primary suspension system. The first frame may include a rigid body which extends around a diaphragm axis along which the drive unit is configured to move the diaphragm. The first frame is preferably located radially outwards from the diaphragm, relative to the diaphragm axis. Suitably, the frame may include one or more rigid supporting elements (e.g. arms) configured to hold a magnet unit of a drive unit in front of the first and/or second radiating surface of the diaphragm (preferably in front of the second radiating surface of the diaphragm). Alternatively, in some examples, the magnet unit may be suspended from the diaphragm via resilient members. The one or more magnet unit resilient members may include one or more (preferably two or more) spiders for example, wherein a spider may be understood as a textile ring having circumferentially extending corrugations (which may facilitate movement along the longitudinal axis whilst preventing movement perpendicular to this axis), as is known in the art. It is envisaged that other forms of the resilient member may be considered by a skilled person, e.g. springs such as metal springs.

First and secondary suspensions systems might be supplemented by a third or further suspension system. Here, the third or further suspensions systems suspend one part of the assembly from another. For instance, the speaker may include an intermediate frame between the diaphragm and the speaker frame (e.g. an outer frame), and the third suspension system may suspend the intermediate frame from the outer frame with the first suspension system suspending the diaphragm from the intermediate frame.

The diaphragm may take various forms as is known in the art. For instance, in one exemplary embodiment, the diaphragm may be a single (monolithic) piece of material. The material forming the diaphragm is suitably lightweight, for instance, the material suitably has a density of 0.1 g/cm$^3$ or less. In exemplary embodiments, the material is extruded polystyrene or extruded polypropylene or similar. In some examples, the diaphragm is covered by a skin, e.g. to protect the diaphragm. Suitably, the skin is formed from paper, carbon fiber, plastic foil, or the like. In some exemplary embodiments, the diaphragm includes several pieces of material attached together. For instance, the diaphragm includes several pieces of material attached to each other by glue. Here, the diaphragm may include a first cone and a second cone being first and second pieces attached together, wherein suitably the first and second cones are glued back to back to attach each cone to the other cone. Here, a front surface of one of the cones forms the first radiating (e.g. front) surface and a back surface of the other cone provides the seconding radiating (e.g. back) surface. In one exemplary embodiment, the first and second cones are formed from paper. The diaphragm may further include one or more cut-outs in one of the radiating surfaces (preferably the second radiating surface), wherein each cut-out is configured to have a respective rigid supporting element extend through it when the loudspeaker is in use. This may allow the loudspeaker to have a lower profile in the thickness direction of the diaphragm.

The dipole loudspeaker of the exemplary embodiments is configured to suspend a diaphragm from a frame via a primary suspension system. Here, suitably, the primary suspension system comprises a plurality of primary suspension elements. That is, the primary suspension system comprises one or more suspension elements via which the diaphragm is suspended from the frame. By way of example, the primary suspension system via which the diaphragm is suspended from the first frame may include one or more suspension elements (e.g. one or more roll suspensions) attached between the first radiating surface and the frame, and one more suspension elements (e.g. one or more roll suspensions) attached between the second radiating surface and the frame. Preferably, the one or more suspension elements (e.g. one or more roll suspensions) attached between the first radiating surface and the frame correspond to (e.g. match, e.g. match in position, number and length) the one or more suspension elements (e.g. one or more roll suspensions) attached between the second radiating surface and the frame. This matching of suspension elements is particularly useful if the diaphragm is non-circular, since it may help to eliminate any asymmetries in the performance of the suspension elements attached to one radiating surface of the diaphragm. The one or more suspension elements may be tuned to have a resonance frequency that is below the frequency spectrum over which the loudspeaker is configured to operate, e.g. to maximize the efficiency of the loudspeaker in the frequency spectrum of interest.

In the exemplary embodiments the dipole speaker is configured to include a drive unit. Here, the drive unit suitably includes an electromagnetic drive unit that includes a magnet unit configured to produce a magnetic field, and a voice coil attached to the diaphragm. In use, the voice coil may be energized (have a current passed through it) to produce a magnetic field which interacts with the magnetic field produced by the magnet unit and which causes the voice coil (and therefore the diaphragm) to move relative to the magnet unit. The magnet unit may include a permanent magnet. The magnet unit may be configured to provide an air gap, and may be configured to provide a magnetic field in the air gap. The voice coil may be configured to sit in the air gap when the diaphragm is at rest. Such drive units are well known. The magnet unit may be located in front of the second radiating surface of the diaphragm.

The dipole loudspeaker of the exemplary embodiments may include a safety element which is located between the magnet unit and the second radiating surface of the diaphragm. The safety element may be configured to prevent the magnet unit from passing through the diaphragm, e.g. in a crash event or another event that involves a sudden deceleration of the loudspeaker (e.g. where the loudspeaker has been moving in the direction of the principal radiating axis of the first radiating surface). The safety element is preferably rigid. The safety element may be a voice coil coupler. Such a safety element may be particularly useful if the loudspeaker is mounted in a headrest of a vehicle seat, since it may help to provide protection for a person sat in such a seat in the event of a vehicle crash. Here, the voice coil may be attached to the diaphragm, e.g. to the second radiating surface of the diaphragm. The voice coil may be attached to (e.g. the second radiating surface of) the diaphragm via a voice coil coupler. The voice coil coupler may also be a safety element, as described above.

In another exemplary embodiment, a safety element may comprise or further comprise a rigid restriction in the cavity in which the dipole loudspeaker is arranged. For instance, the rigid restriction may be a part of the chassis frame of the headrest, and in particular an internal flange formed in the cavity in which the loudspeaker is arranged. Here, a rigid part of the dipole loudspeaker is configured to be sized so as to overlap the rigid restriction in a forward direction. For instance, the rigid part of the dipole loudspeaker is suitably the frame. In one embodiment, the rigid part of the dipole loudspeaker is a projecting flange of the speaker frame. Thus, abutment between the rigid part of the frame and the rigid restriction in the cavity would, in the event of a vehicle crash for instance, provide a safety feature restricting or preventing the dipole loudspeaker from being ejected forwardly through the hardest. In embodiments including a rigid restriction in the cavity, the dipole loudspeaker may be connected directly to the rigid restriction, for instance via a flexible member such as a foam member in order to provide the second suspension system.

The loudspeaker may be configured for use in performing noise cancelation, e.g. at bass frequencies. For example, the drive unit may be configured to drive the diaphragm (e.g. at bass frequencies) so that the first radiating surface produces sound configured to cancel environmental sound as detected by one or more microphones. This may be of use in a noisy environment, such as in a car or aeroplane, e.g. where the loudspeaker is part of a seat assembly including a vehicle seat. Noise cancellation techniques are well-known.

According to the above, in one aspect there is therefore provided a dipole loudspeaker. The dipole loudspeaker includes a diaphragm and a frame. The diaphragm is suspended from the frame by a primary suspension system. The diaphragm has a first radiating surface and a second radiating surface that are located on opposite faces of the diaphragm. The dipole loudspeaker also includes a drive unit configured to move the diaphragm at bass frequencies. Because the first and second radiating surfaces are driven to move at bass frequencies, the first and second radiating surfaces produce sound at bass frequencies. Moreover, because the first and second radiating surfaces are opposed surfaces of the same diaphragm, the sound produced by the first radiating surface is in antiphase with sound produced by the second radiating surface. Further, in the exemplary embodiments, the dipole loudspeaker is not configured to have a second frame that suspends the first frame from a secondary suspension system. Rather, the dipole loudspeaker of the aspect is specifically configured to be attached to an attachment formation of a headrest. Here, the dipole loudspeaker includes a corresponding attachment formation. In one exemplary embodiment, the corresponding attachment formation is connected directly to the frame. That is, the corresponding attachment formation is not connected to the frame via a secondary suspension system. In an alternative exemplary embodiment, the corresponding attachment formation is attached to the frame via a secondary suspension system In one exemplary embodiment, the dipole loudspeaker having the corresponding attachment formation attached to the frame is configured such that the corresponding attachment formation on the dipole loudspeaker, snap fits to the attachment formation on the headrest. Here, the dipole loudspeaker can be mounted in the headrest without extra fixtures. Moreover, advantageously, the snap fit of the attachment formation on the headrest and the corresponding attachment formation on the frame fixes the dipole loudspeaker securely in the headrest. The snap fit interference of the two attachment formations can be achieved in a number of ways. For instance, in one embodiment, one of the attachment formations comprises a semi enclosed cavity for receiving a part of the corresponding attachment formation. Here, the semi enclosed cavity is caused to receive and grip the corresponding part. For instance, one of the parts is resilient such that it deforms as the dipole loudspeaker is assembled to be mounted in the headrest. The deformation opens the cavity or compresses the corresponding part (or both) so that the corresponding part can be pushed or moved into the cavity by relative movement in a first direction. After the resilient part (or parts) resume their original shape, the corresponding part is gripped by the semi-enclosed cavity. Here, by gripped, it is meant that the semi enclosed cavity has an opening in the direction of the first direction, wherein the opening is smaller than a size of the corresponding part. Thus, when said corresponding part has been pushed into the semi enclosed cavity and is located therein, the corresponding part is gripped, with the opening being sized smaller than the corresponding part and therefore preventing relative movement of the two to decouple the parts in the reverse of the first direction. Consequently, the dipole loudspeaker comprises a corresponding attachment formation, wherein the corresponding attachment formation comprises either a semi-enclosed cavity or a part to be received by a semi enclosed cavity.

In one embodiment the dipole loudspeaker comprises a corresponding attachment formation for engaging with the attachment formation of the headrest. Suitably, the corresponding attachment formation comprises a semi enclosed cavity. The semi enclosed cavity has an opening. The opening is arranged to receive a part of the attachment formation on the headrest when the headrest is moved in an assembly direction. Whilst the semi enclosed cavity may be resiliently deformable to open when receiving the corresponding part and to close around the part when a force causing the deformation is removed, in one embodiment, the semi enclosed cavity is relatively rigid, or at least relatively rigid compared to corresponding part, such that the corresponding part is arranged to deform as it is forced through the opening. For instance, the corresponding part of the attachment formation on the headrest may be formed from foam. Here, the foam compresses as it is pushed into the semi enclosed cavity when the loudspeaker is moved relative to the headrest in the assembly direction. Advantageously, a snap fit connection is therefore formed to connect the dipole loudspeaker to the headrest.

In one alternative embodiment, the dipole loudspeaker comprises a corresponding attachment formation for engaging with the attachment formation of the headrest. Suitably, the corresponding attachment formation comprises a projecting part for being received by a semi enclosed cavity of an attachment formation on the headrest. Whilst the semi enclosed cavity may be arranged to resiliently deform to open and close an opening to the semi enclosed cavity, additionally or alternatively, according to an exemplary embodiment, the projecting part from the frame of the dipole loudspeaker is arranged to deform as it is pushed into the semi enclosed cavity. For instance, the projecting part is caused to deform as the projecting part is pushed into the semi enclosed cavity in the assembly direction. Here the projecting part suitably comprises a bent plate wherein the bends provide a suitable hinge for deforming the projecting part. Suitably, the projecting part of the headrest's attachment formation may be formed of foam. Advantageously, a snap fit connection is therefore formed to connect the dipole loudspeaker to the headrest.

As an alternative to a snap fitting connection between the attachment formation on the headrest and the corresponding attachment formation that extends from the frame of the dipole loudspeaker, a push fitting may be utilised. In embodiments comprising a push fitting, one of the parts is arranged to surround the other about at least two opposed sides. The part that surrounds the other does not grip the other part as is the case in a snap fit fitting, rather, the parts are held together securely due to the length of the part that is surrounded. For instance, one of the parts comprises an open cavity and the other part is configured to fit within the open cavity. The part that fits in the cavity may be configured to have a sufficient length to be retained within the cavity during the relative movement range of the parts expected in use. In one exemplary embodiment, the part that is retained in the cavity may be compressed into the open cavity and to remain in a compressed arrangement. Here, the part that is retained in the cavity is sized to be larger, or marginally larger than the cavity. However, it is envisaged the push fit may also be configured wherein the two parts are sized the same size or the part that is retained is sized marginally smaller than the cavity. With a push fit, the dipole loudspeaker can be slid onto the attachment formation on the headrest. Here, the direction of sliding may be along an axis of the attachment formations. For instance along an axis parallel to a plane of the frame. An alternative to sliding the push fit connection, one of the parts may be substantially resiliently deformable so that the other part can be pushed into the cavity. For instance, one of the parts, and preferably the attachment formation on the headrest may be formed from foam. Here the foam compresses and deforms to allow the corresponding attachment formation to be pushed in to a cavity formed in the foam attachment formation. Once located, the attachment formation can reform around a projecting part that extends from the frame. Here the projecting part may be substantially rigid. Or at least substantially rigid relative to the attachment formation forming the cavity. Advantageously, here, the dipole loudspeaker can be mounted in the headrest without extra fixtures In one embodiment the dipole loudspeaker comprises a corresponding attachment formation for engaging with the attachment formation of the headrest. Suitably, the corresponding attachment formation comprises an open cavity. The open cavity has an opening. Here, the opening is the same size or greater than the size across the cavity. The opening is arranged to receive a part of the attachment formation on the headrest when the headrest is assembled to the dipole loudspeaker. In one embodiment, the open cavity is relatively rigid, or at least relatively rigid compared to a corresponding part. For instance, the corresponding part of the attachment formation on the headrest may be formed from foam. Whereas the attachment formation attached to the frame of the dipole loudspeaker and that forms the open cavity may be a similar rigidness to the frame. Advantageously, a push fit connection is therefore formed to connect the dipole loudspeaker to the headrest.

In one alternative embodiment, the dipole loudspeaker comprises a corresponding attachment formation for engaging with the attachment formation of the headrest. Suitably, the corresponding attachment formation comprises a projecting part for being received by an open cavity of an attachment formation on the headrest. Whilst the open cavity may be arranged to resiliently deform to receive the projecting part, additionally or alternatively, according to an exemplary embodiment, the projecting part from the frame of the dipole loudspeaker suitably comprises a bent plate. Advantageously, a snap fit connection is therefore formed to connect the dipole loudspeaker to the headrest.

In the exemplary embodiments wherein one of the attachment formation on the headrest or the corresponding attachment formation on the dipole loudspeaker comprises an open cavity for a push fit or a semi enclosed cavity for a snap fit, the projecting part may suitably extend around a substantial perimeter of the frame. For instance, the projecting part may form a continuous projecting part about a periphery of the frame. Here the corresponding cavity may also extend a substantial perimeter of the frame, that is, the cavity may also be substantially continuous. Alternatively, the cavity may be non-continuous forming one or more cavity portions around the periphery.

Alternatively, in the exemplary embodiments wherein one of the attachment formation on the headrest or the corresponding attachment formation on the dipole loudspeaker comprises an open cavity for a push fit or a semi enclosed cavity for a snap fit, the projecting part may suitably extend non-continuously around a perimeter of the frame. That is, the projecting part form one or more projecting parts that each extend a partial distance about the perimeter of the frame. Here the corresponding cavity may extend a substantial perimeter of the frame, that is, the cavity may be substantially continuous. Alternatively, the cavity may be non-continuous forming one or more cavity portions around the periphery where the cavity portions correspond to the projecting part portions.

In some exemplary embodiments, the attachment formation of the headrest is fixed to the corresponding attachment formation on the frame of the dipole loudspeaker. For instance the attachment formations may be secured together with adhesive or the like. Alternatively, a mechanical fixing may be used. For instance, the mechanical fixing may be a nut and bolt or the like. In these exemplary embodiments, the dipole loudspeaker comprises a corresponding attachment formation that extends from the frame and the corresponding attachment formation is a projecting part configured for cooperating with the mechanical fixing. For instance, the projecting part may include an aperture through which the mechanical fixing is passed. Suitably, the projecting part is substantially rigid. That is the projecting part has a rigidity similar to the rigidity of the frame. The projecting part may be continuous about the periphery of the frame or may be non-continuous, to form a plurality of projecting portions. In any event, the mechanical fixings ay be applied at discreet points about the periphery. In the exemplary embodiments utilising mechanical fixings, the attachment formation on the headrest is also suitably relatively rigid, for instance having a similar rigidity to the projecting part of the dipole loudspeaker and/or the rigidity of the frame.

According to the above, in a second aspect there is therefore provided an audio system comprising the dipole loudspeaker and a headrest. The dipole loudspeaker is mounted in the headrest. The headrest includes a main body assembly. The main body assembly is shaped to include an aperture in which the dipole loudspeaker is mounted. For instance, the aperture extends from a front face of the main body assembly to a back surface of the main body assembly. When the dipole loudspeaker is mounted in the aperture, a first opening is formed between a front face of the dipole loudspeaker and the front of the headrest. The first opening may be formed form one or more first opening portions. Suitably, the first opening is configured to allow sound produced from the first radiating surface (e.g. the front surface) of the dipole loudspeaker, to propagate out of a first side (e.g. the front) of the headrest. Furthermore, when the dipole loudspeaker is mounted in the aperture, a second opening is formed between a back face of the dipole loudspeaker and the back of the headrest. The second opening may be formed from one or more second opening portions. Suitably, the second opening is configured to allow sound produced from the second radiating surface (e.g. the back surface) of the dipole loudspeaker, to propagate out of a second side (e.g. the front) of the headrest. Here, the first and second sides of the headrest are opposed sides, for instance front and back sides of the headrest.

In the exemplary embodiments, the first and second openings are acoustic openings. That is, the aperture through the headrest main body assembly and in which the dipole loudspeaker is mounted, may be covered by, for instance, acoustically transparent material. For instance, the head rest main body assembly may comprise a foam structure forming the aperture and the main body assembly may further comprise a cover. The cover surrounds the foam structure and provides an aesthetic function. The cover is acoustically transparent, meaning it does not, or does not substantially, inhibit sound propagation through the material. Moreover, the main body assembly may include additional foam components that fit with the foam structure to provide the shape of the headrest. For instance, open cell foam components that are substantially acoustically transparent can be used as required to provide the headrest structure without closing the openings. Since acoustically transparent foam provides less resistance to compression than the acoustically resistive foam used to form the foam structure, optionally, further acoustically resistive foam pieces can be used where necessary to provide support to a listener's head.

According to the exemplary embodiments, the second aspect comprises a waveguide formation which is configured to direct sound produced by the first radiating surface out of the first opening, and to direct sound produced by the second radiating surface out of the second opening. The waveguide formation is formed on surfaces of the headrest main body assembly, and suitably on the internal surfaces of the aperture. The waveguide formation is formed of an acoustically resistive material. For instance, the waveguide formation may be formed from foam. Suitably a plurality of waveguide projections form the waveguide formation. Here, one or more of the waveguide projections act to guide the sound out of the first opening. The waveguide projections act to close substantial gaps between the headrest main body assembly and the frame of the dipole loudspeaker. Thus the sound from the first radiating surface is isolated from the second opening and the shortest sound path between the first radiating surface and the second radiating surface is guided to be external to the headrest. Also, the sound from the second radiating surface is isolated from the first opening and the shortest sound path between the second radiating surface and the first radiating surface is guided to be external to the headrest. In preferred embodiments, the waveguide formations close any gaps to the frame such that in combination, the waveguide formation and the frame form a sound baffle which inhibits sound travelling between the first and second radiating surfaces through the aperture of the headrest. Preferably, the waveguide formations are formed integrally to a component of the main body assembly. As an example, the main body assembly comprises a foam structure, the foam structure provides the aperture and the waveguide formation is integral to the foam structure.

According to the exemplary embodiments, the second aspect comprises an attachment formation on the headrest for attaching to the dipole loudspeaker. The attachment formation suspends the frame of the dipole loudspeaker from the main body assembly of the headrest. For instance, the attachment formation suspends the frame from inner sides of the aperture through the headrest main body assembly. Here, the attachment formation forms a secondary suspension system. The secondary suspension system is suitably one or more secondary suspension elements.

The one or more secondary suspension elements may be tuned to have a resonance frequency that is below the frequency spectrum over which the loudspeaker is configured to operate, e.g. so as to limit the force on a supporting structure. The one or more secondary suspension elements may be tuned to have a resonance frequency that is lower than a resonance frequency that the one or more primary suspension elements are tuned to have. In exemplary embodiments, the one or more secondary suspension elements are tuned to have a predetermined resonance frequency. Whilst for static backrests where the loudspeaker is arranged substantially vertically, the predetermined resonance frequency may be 20 Hz or lower, more preferably 10 Hz or lower, more preferably 5 Hz or lower, for reclining backrests the preferred tuning frequency of the second suspension is between 10 Hz and 20 Hz. This is because, below 10 Hz the static deflection of the second suspension, when the seat is reclined, becomes quickly excessive. Thus, the predetermined resonance frequency is preferably below 20 Hz and for some embodiments, preferably above 10 Hz.

In some exemplary embodiments, the attachment formation comprises one or more attachment projections to which the frame is attached. Here, the plurality of attachment projections can be resilient such that the resilient nature of the attachment projection provides the secondary suspension element. For instance, the one or more attachment projections can be formed from foam. The one or more attachment projections can be integral to a component of the main body assembly. As an example, the main body assembly comprises a foam structure, the foam structure provides the aperture in which the dipole loudspeaker is mounted and the attachment formation is integral to the foam structure.

Suitably, the attachment formation, and each attachment projection provided to form the attachment formation, can be formed from foam. For instance acoustical resistive foam. As explained above, the attachment formation can be a projection to cooperate with a corresponding attachment formation of the dipole speaker. For instance, the attachment formation may be one or more projections that cooperate with an open cavity, or a closed cavity, or a projection and further fixing on the frame of the dipole speaker. Here, the projection from the headrest suitably includes a distal end spaced from the headrest by a resilient portion. The resilient portion provides at least some of the resiliency for the secondary suspension system. Here, the resilient portion can be controlled to provide a tuned stiffness profile optimised for the desired secondary suspension system characteristics. For instance, the stiffness and progressivity of the resilient portion can be selected by optimising the material characteristics, the length and cross sectional area of the resilient portion, a number and size of any cavities in and around the section of the headrest from which the projection extends. Moreover, stiffening elements can be embedded within the foam. Thus, in some embodiments the projections forming the attachment formations can include embedded components. The embedded components may be corrugated suspension elements, monolithic sheets or segments, or stiffening plastic or metal components. Furthermore, the number of projections can also be used to control and optimise the stiffness profile for performance.

In particularly suitable exemplary embodiments, the attachment formation and the waveguide formation are common. That is, the headrest main body assembly includes projections from the internal sides of the aperture. The projections include an attachment formation on the end for coupling with a corresponding attachment formation on the dipole loudspeaker. The projections are resilient to provide the secondary suspension system and the projections, by coupling closely around the frame, act as a waveguide formation to isolate each side of the aperture acoustically from the other by guiding the respective sounds through the respective openings.

According to the above, in a further aspect there is provided a method of assembling an audio system of previous aspects, the method comprises attaching the dipole loudspeaker of previous aspects to a headrest, wherein the method comprises connecting the frame of the dipole loudspeaker to an attachment formation of the headrest. In exemplary embodiments, the method may comprise pushing a corresponding attachment formation together with the attachment formation of the headrest. Here, one of the attachment formations are deformed to allow the two parts to be pushed and retained together.

The method suitably, according to some embodiments, comprises optimising the stiffness of the attachment formation so as to provide a secondary suspension system to the frame. Here, the method comprises inserting components into foam, and/or creating cavities in the attachment formations and/or creating cavities in a main body assembly of the headrest in the region where the attachment formation extends from.

A dipole loudspeaker according to the above and an audio system comprising the dipole loudspeaker and a headrest housing the dipole loudspeaker may find utility in any application where it might be desirable to provide a personal sound cocoon. A particular suitable environment might be a headrest for a vehicle seat such as a car seat or an aeroplane seat. Here, the seats are able to be reclined (reclineable) so that a backrest of the seat is able to be positioned in varying degrees of inclination to a generally horizontal seat part. Because the headrest is generally attached, or indeed integral to, the backrest, the dipole loudspeaker may be required to be optimised to operate across a range of inclinations. As explained above, the stiffness of the attachment formation can be controlled through a number of factors to ensure optimal performance.

In a further aspect, there is provided a seat assembly including the audio system of previous aspects. The seat may be a vehicle seat, for use in a vehicle such as a car ("car seat") or an aeroplane ("plane seat"). The seat could also be a seat for use outside of a vehicle. For example, the seat could be a seat for a computer game player, a seat for use in studio monitoring or home entertainment. In a further aspect, there is provided a vehicle (e.g. a car or an aeroplane) having a plurality of seat assemblies according to the previous aspect.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
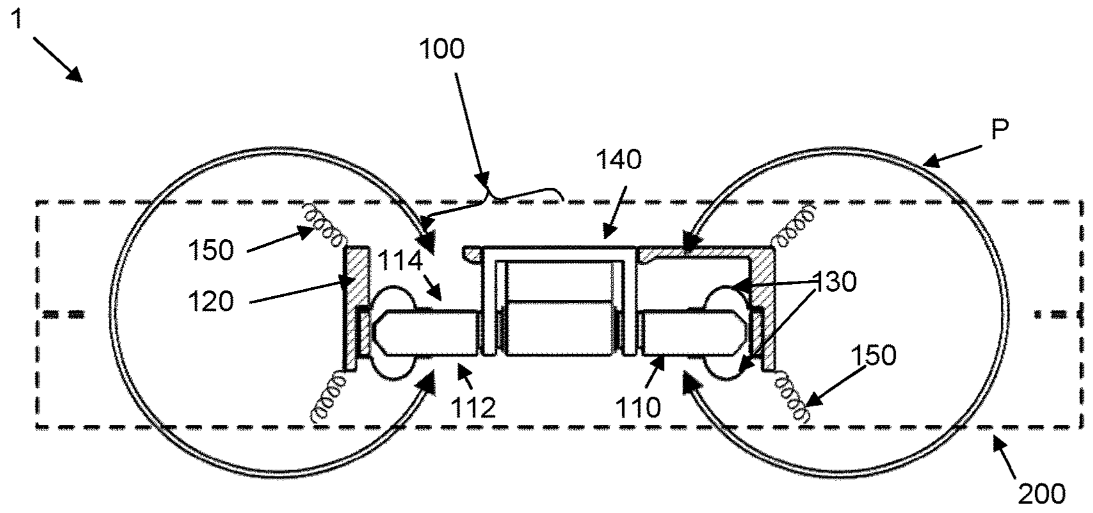
FIG. 1 shows a top view of a simplified audio system with a dipole loudspeaker suspended in a hypothetical acoustic transparent headrest according to a first model.

Referring to FIG. 1 there is shown an audio system 1 comprising a dipole loudspeaker 100 mounted in a headrest 200. The dipole loudspeaker 100 comprises a diaphragm 110 having a first radiating surface 112 and a second radiating surface 114. The first surface 112 is shown as a front surface, which faces towards a passenger seated in a seat that incorporates the headrest, and the second surface 114 is shown as the opposed rea surface, which faces away from a passenger seated in a seat that incorporates the headrest. Suitably, the diaphragm is made of extruded polystyrene foam or similar and may optionally be reinforced with a surface skin. The diaphragm 110 is suspended from a frame 120 by a primary suspension system 130. The dipole loudspeaker 100 also includes a drive unit 140 configured to drive the diaphragm 110 to produce bass frequencies as is known in the art. Consequently, in operation, the dipole speaker 100 is operational to drive the first radiating surface 112 to emit a sound in bass frequencies and the second surface 114 to emit a response 180 degrees out of phase. This out of phase response is an anti-phase sound and interferes with the sound from the first surface to act to cancel out the sound. The shortest path length of the sound from the first surface 112 to the second surface 114 (and vice a versa) is depicted in FIG. 1 by arrow P. The general structure and operation of the dipole speaker is explained above and in more detail in WO2019/121266, and the description of the dipole speaker therein is herein incorporated by reference.

FIG. 1 is a simplistic top view prepared for modelling purposes and to show the operation of a low frequency dipole loudspeaker 100 suspended directly from the headrest 200. Here it was identified that by directly mounting the frame 120 to the headrest via a secondary suspension system (shown in FIG. 1 as resilient spring elements 150), the second frame required by the dipole speaker of WO2019/121266 could be omitted from the audio system 1. In FIG. 1, the headrest is modelled as being hypothetically acoustically transparent. Here the shortest path length P is defined mainly by the dimensions of the dipole loudspeaker 100. The path length P is illustratively shown by circular arrow, though it will be appreciated that a more realistic presentation of the actual path would follow the contours of the vibrating surface and surrounding obstacles.

Figure 2:
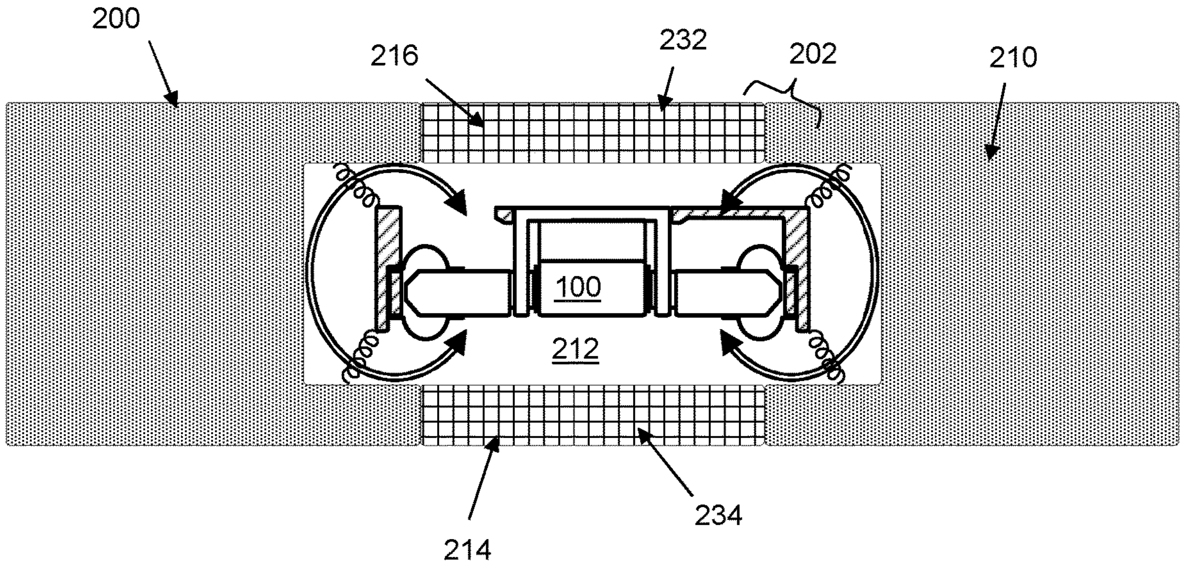
FIG. 2 shows a top view of the audio system of FIG. 1, depicting a headrest having a more realistic acoustic characteristic according to a second model.

FIG. 2 depicts the same dipole loudspeaker mounted in a headrest shown as comprising a more realistic foam representation. For instance, the headrest 200 is formed from a foam structure 210 forming the main structure of the headrest to provide support to a listener, with the dipole loudspeaker 100 mounted in a cavity 212 in the foam structure. The foam structure is formed from foam selected to provide support to a listener and may have a density of around 20 $Kg/m^3$ and 150 $kg/m^3$ and more typically between 50 $kg/m^3$ and 100 $kg/m^3$. For instance the foam structure may be formed from an open cell PU foam having high flow resistance and therefor high acoustic resistance. The foam structure can be milled resulting in open surfaces, or it can be moulded resulting in a closed cell surface and very high, or infinite flow resistance. A front opening 214 to the cavity 212 and a rear opening 216 to the cavity are formed through the foam structure. The openings are acoustic openings and are shown as being filled with acoustically transparent foam. For instance, the headrest 200 is formed from a main body assembly 202 comprising the foam structure 210 and pieces of acoustically transparent foam 230. Here the acoustically transparent foam is shown as piece 232 and 234 configured to substantially close the openings 214, 216. Although the openings 212, 214 may be structurally closed, they remain acoustically open, that is open for sound propagation there through. The acoustically transparent foam 230 may be an open cell foam selected for acoustic transparency wherein the material is chosen to have a very low flow resistance. For instance suitably the acoustically transparent foam 230 may be a material with a specific airflow resistance (Rs) lower than 20 Pa·s/m and more preferably lower than 10 Pa·s/m.

It has been found that the resulting path length P of the FIG. 2 model is shortened compared to the acoustically transparent modelled headrest shown in FIG. 1. It is thought the presence of the foam structure acts to guide the sound and shorten the path length. That is, by enclosing the path length and allowing the path length to be guided inside the cavity the path length P is shortened, which reduces the effective output of the audio system 1 through a partial enhanced acoustic short circuit.

Figure 3:
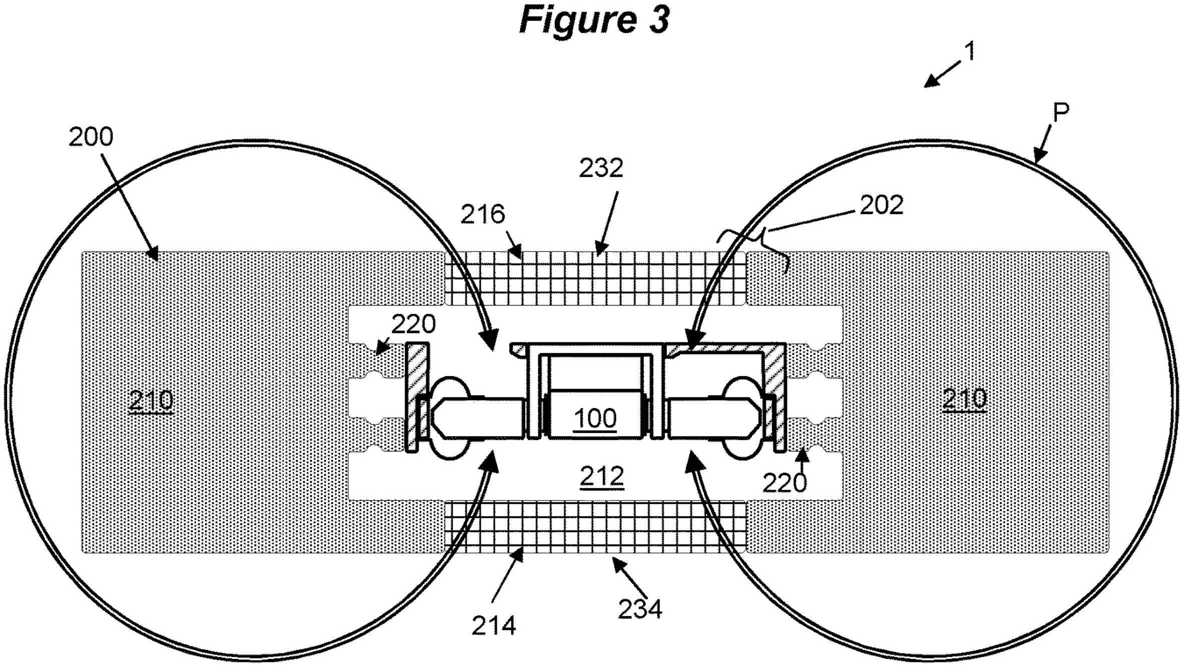
FIG. 3 shows a top view of an audio system according to a first embodiment.

According to one exemplary embodiment, FIG. 3 depicts the same dipole speaker 100 used to model FIGS. 1 and 2 and mounted in an exemplary headrest 200. Here, the headrest 100 has been adapted to mount the frame 120 directly to the headrest 200 via a projecting element 220. The projecting element 220 extends from an inside wall of the cavity 212 of the headrest. As explained herein, the projecting element 220 can take a number of forms, but is shown in FIG. 3 as a first projection 221 and a second projection 222 that extend around the periphery of the frame. Also explained further herein, the frame can be connected to the projecting element in a number of ways, but is shown in FIG. 3 as being fixed with glue or the like.

It has been found that by arranging the projecting element 220 to extend between the headrest foam structure, which is acoustically resistive, and the frame 220 of the dipole loudspeaker, in a manner to substantially close a first or front side of the cavity 212 from a second or back side of the cavity 212, the front radiating surface of the dipole loud speaker can be acoustically isolated from the back radiating surface. Conveniently, the projecting elements can be formed integrally from the structural foam and is therefore acoustically resistive, and also provides a convenient manufacturing process for the projecting element 220 without an additional process or particular additional cost. Here, the projecting element 220 acts as a waveguide formation to guide sound. Thus, the projecting element 220 acts as a waveguide formation to guide sound propagating from the first or front resonating surface out of the first or front opening 214. The projecting element 220 also acts as a waveguide formation to guide sound propagating from the second or back resonating surface out of the second or back opening 216. In acting as a waveguide formation, the projecting element 220 guides the path length externally to the headrest as shown by arrow P. Advantageously, by guiding the path length externally to the headrest, an acoustic short circuit within the headrest is prevented and a larger acoustic path length is obtained as compared to the arrangements shown in both FIG. 1 and FIG. 2. As mentioned above, the headrest foam and the projecting elements, for instance the attachment formation and the waveguide formation, are acoustically resistive. Suitably, the material is a suitable foam, and in particular a foam or other material having a Specific Airflow Resistance (Rs) higher than 30 Pa·s/m or more preferred higher than 60 Pa·s/m.

Figure 4:
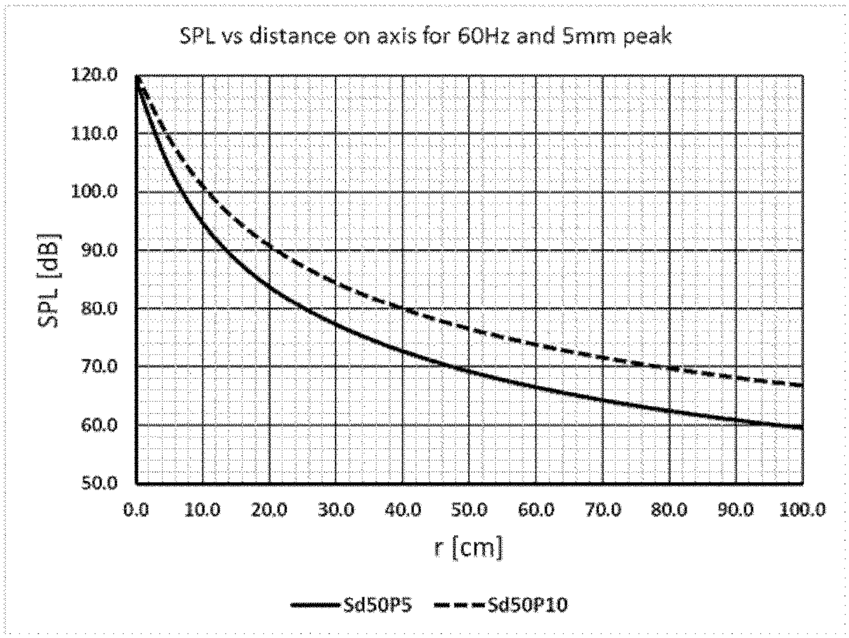
FIG. 4 plots the SPL against distance from the resonating surface for the first model and the exemplary embodiment.

Here, FIG. 4 plots the Sound Pressure Level (SPL) at distances from the first resonating surface of the diaphragm for a frequency of 60 Hz. The diaphragm makes an excursion of 5 mm peak. The solid line Sd50P5 plots the expected results for the arrangement of the audio system shown in FIG. 1 wherein the headrest is modelled as acoustically transparent. The dotted line Sp50P10 plots the expected results for the arrangement shown in FIG. 3 using the exemplary headrest including the projecting element 220 acting as a waveguide formation to guide the path length P externally to the headrest and, in the modelled embodiments, extend the path length P from 5 cm to 10 cm compared to the FIG. 1 model. The SPL v distance from the diaphragm of the FIG. 2 embodiment has not been modelled, but because the path length is shorter than the path length of FIG. 1, it is believed if FIG. 2 was plotted on the graph shown in FIG. 4, the line would be beneath the solid line for the FIG. 1 model. It will be appreciated that the graph of FIG. 4 illustrates that by increasing the path length P, the SPL at a given distance is increased for the exemplary headrest incorporating waveguide formations to guide the sound from the same dipole loudspeaker 100 and extend the path length to be external to the headrest. Suitably, in the exemplary embodiment wherein the waveguide structure extends the path length externally to the headrest 200, a resulting path length is preferably arranged to be between 5 cm and 20 cm, more preferably between 7.5 cm and 15 cm.

Referring back to FIG. 3, the projecting element 220 also provides the function of the secondary suspension system. Here, the projecting elements provide attachment formations for attaching the dipole loudspeaker to the headrest and specifically, the structural foam 210 directly to the frame 120. That is, the projecting elements are provided with a resiliency and a stiffness characteristic optimised for the secondary suspension system. Advantageously, by forming the secondary suspension system from projecting element 220, which is formed integrally to the structural foam 210, the secondary suspension system can be formed conveniently. Further explanation of the projecting element 220 forming the secondary suspension system will be described below.

In FIG. 3, the exemplary headrest is shown with the projecting element 220 combining the function of the waveguide formation with the function of the attachment formation. However, in some embodiments, the functions are separated and the projecting element 220 only provides one of the functions, with the other function provide by a separate element.

Figure 5:
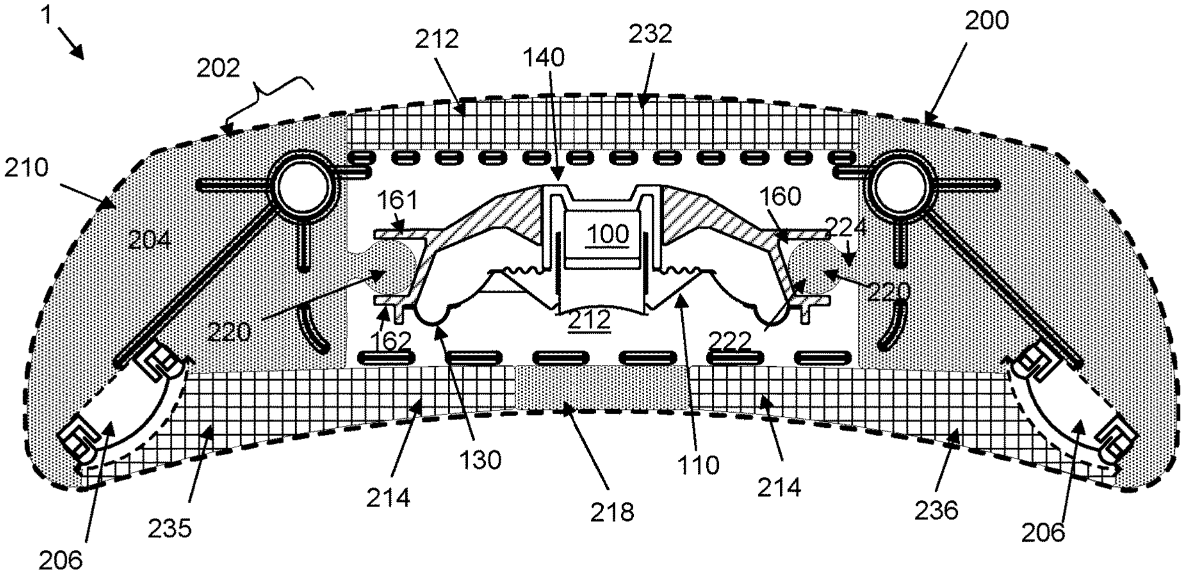
FIG. 5 shows a top view of an audio system according to a second embodiment.

A second exemplary embodiment of an audio system 1 is shown in FIG. 5. The dipole loudspeaker 100 is shown as having a different construction to the dipole loudspeaker 100 of the previous embodiment. However, the main components and function remain of a diaphragm 110 suspended from a frame 120 by a primary suspension system 130 and including a drive unit 140 for driving the diaphragm to vibrate at bass frequencies. In FIG. 5, the dipole loudspeaker 100 has been adapted to include a corresponding attachment formation 160. The attachment formation 160 connects to the attachment formation of the headrest to fix the frame 120 to the headrest 200. The corresponding attachment formation is shown as an open cavity defined by parallel fins 161, 162. The fins 161, 162 receive the attachment formation of the headrest. As shown, suitably the attachment formation is a bulbous head 222 of the projecting element 220. The bulbous head may be oversized relative to the open cavity between fins 161, 162 such that the corresponding attachment formation is pushed on to the attachment formation of the headrest, with the bulbous head compressing between the fins. Alternatively, the bulbous head 222 may be correspondingly sized or marginally undersized to push fit therein.

In the embodiment shown in FIG. 5, the projecting element 220 extends from the structural foam 210 and from around the middle of the cavity 212 formed therein. A rear opening 216 is formed as well as a front opening 214. Here, the front opening 212 has been divided in to first and second apertures by a central piece 218 of the foam structure. The central piece 218 of the foam structure is provided to support the listeners head 2 (see FIG. 7) as the acoustically transparent foam may be too soft to provide adequate support to the user. Again, the headrest is formed from a main body assembly 202 comprising the foam structure 210 and acoustically transparent material 230. The acoustically transparent material 230 is shown as rear piece 232 and first and second front pieces 235, 236.

The headrest 200 is formed from a main body assembly 202 including the foam structure 210 and the acoustically transparent filler pieces 230. The acoustically transparent pieces maintain the acoustic openings 214, 216 but physically close the main body assembly 202 to enclose the cavity 212 in which the dipole loudspeaker 100 is mounted. The main body assembly 202 of the headrest 200 also includes a chassis frame 204 that is provided to give structural and safety features to the headrest as is known in the field of headrest design. The chassis frame may include a cage portion around the dipole loudspeaker to provide a safety aspect to resist movement of the dipole speaker out of the headrest in an impact. The chassis frame also provides attachment locations for sticks 205 (see FIG. 6) for connecting the headrest to a seat back as is known.

Figure 6:
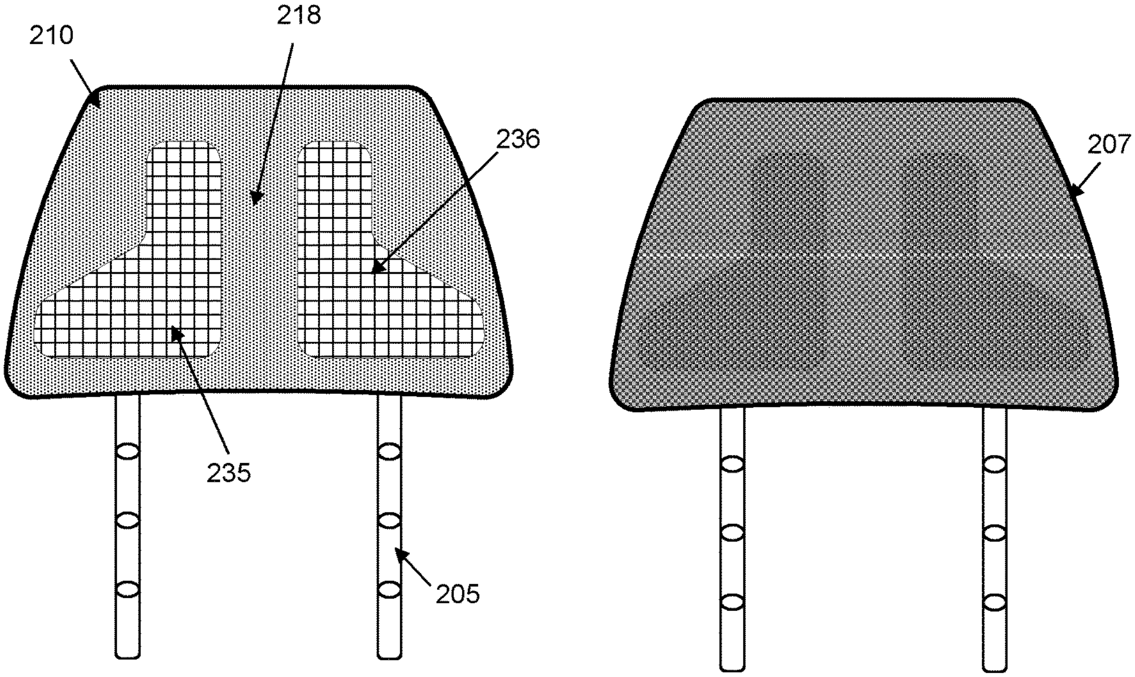
FIG. 6 shows front views of the audio system of the second embodiment.
Figure 7:
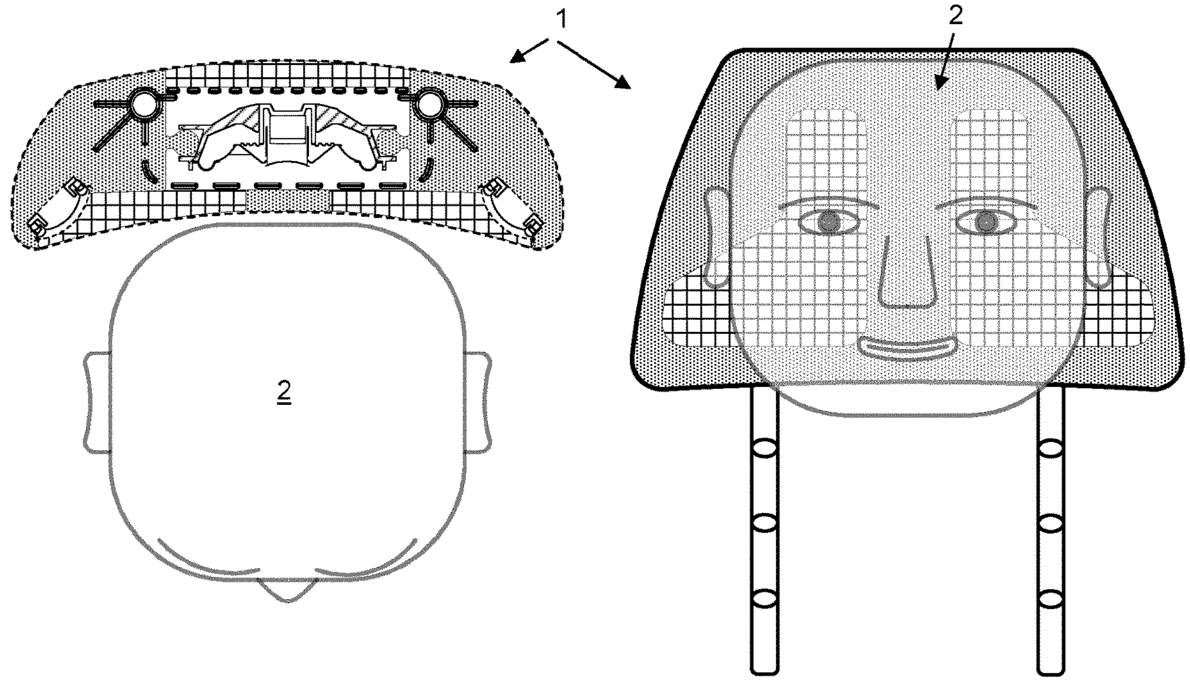
FIG. 7 shows front and top views of the audio system of the second embodiment including a depiction of a listener's position.

Although the present application is primarily concerned with providing a dipole loud speaker for producing bass frequencies, it will be understood that the audio system will also include directional speakers for the mid to high frequencies. Mid-high frequency speakers 206 are shown in FIG. 5 as being attached to the chassis frame 204 at sides of the headrest to direct sound to a personal sound cocoon in which the listener's head is arranged to be located. It will be understood, as shown, that the acoustically transparent front pieces 235, 236, are extended to provide an opening between the mid-high frequency speakers 206 and the front of the headrest. Referring to FIG. 6, the main body assembly is shown from the front with the acoustically transparent front pieces assembled into the foam structure 210 before and after an acoustically transparent finishing material 207 is applied. The finishing material has a low flow resistance and may be a low flow resistance textile or perforated leather. FIG. 7 shows a user 2 positioned in an intended position relative to the headrest 200. Here the audio system 1 provides a personal sound cocoon around the user with a good (high) SPL within the personal sound cocoon and a good (low) SPL outside thereof.

Referring back to FIG. 5, in the second embodiment, the projecting element 220 provides both the waveguide formation function and the attachment formation function. For instance, the projecting element 220 acts with the frame 120 to provide a baffle that isolates the front and back of the cavity.

Also, the projecting element 220 includes the bulbous head 222 and together forms an attachment formation that attaches the dipole loudspeaker to the headrest and provides the secondary suspension system. Here, a resilient portion 224 between the sides of the cavity and the bulbous head can be tuned to provide the required stiffness. For instance a corrugation is shown and the corrugation size can be adapted to provide a required stiffness to the resilient portion 224

Figure 8A:
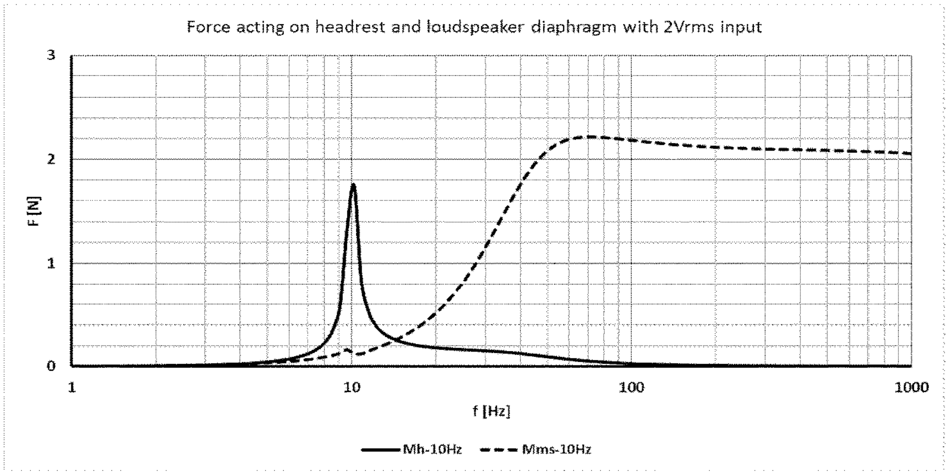
FIGS. 8*a* and 8*b* plots the force acting on the headrest and diaphragm over the frequency range and for an upright seat angle and a reclined seat angle.
Figure 8B:
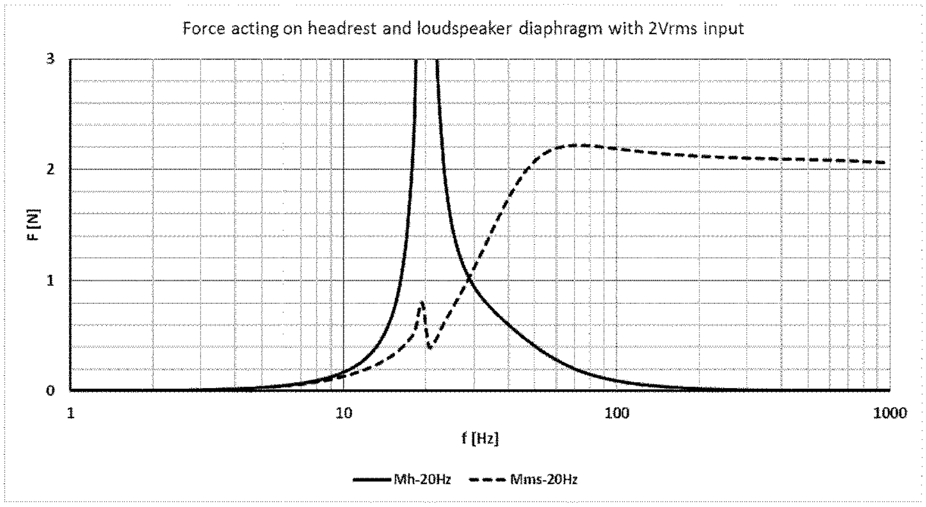

Various methods of controlling the stiffness of the projecting element 220 to match a required stiffness will be discussed below. The optimum stiffness can be calculated using dynamic and static tuning calculation as is known. For instance, by plotting the force applied to the headrest from the operating dipole loudspeaker and the force applied to the diaphragm, the stiffness of the secondary suspension can be optimised. Here, referring to FIG. 8, the solid plot line represents the force acting on the headrest and that can create undesirable vibrations through the headrest if too elevated, and the dotted line represents the force acting on the diaphragm, which produces the SPL. Here, in the operating frequency range of the dipole loudspeaker (typically in the range of 40 Hz to 200 Hz), the secondary suspension system stiffness can be optimised to reduce the force to the headrest. For seats that recline, the optimisation is required to take into account the change in suspension system created by a change in angle (relative to vertical). In FIG. 8, FIG. **8*a* shows the seat in an upright (vertical) orientation and FIG. 8*b* shows the change in force created across the frequency range created by the change in stiffness of the secondary suspension system due to the change in angle (plotted for an angle of 45° to the vertical. In FIG. 8**, Mms is the moving diaphragm mass, BI is the force generated by the dipole speaker drive unit, Kms is the combined stiffness of the diaphragm suspension to the frame of the dipole loud speaker, MI is the mass of the loudspeaker frame and driver, and Ks2 is the stiffness of the secondary suspension system.

Figure 9A:
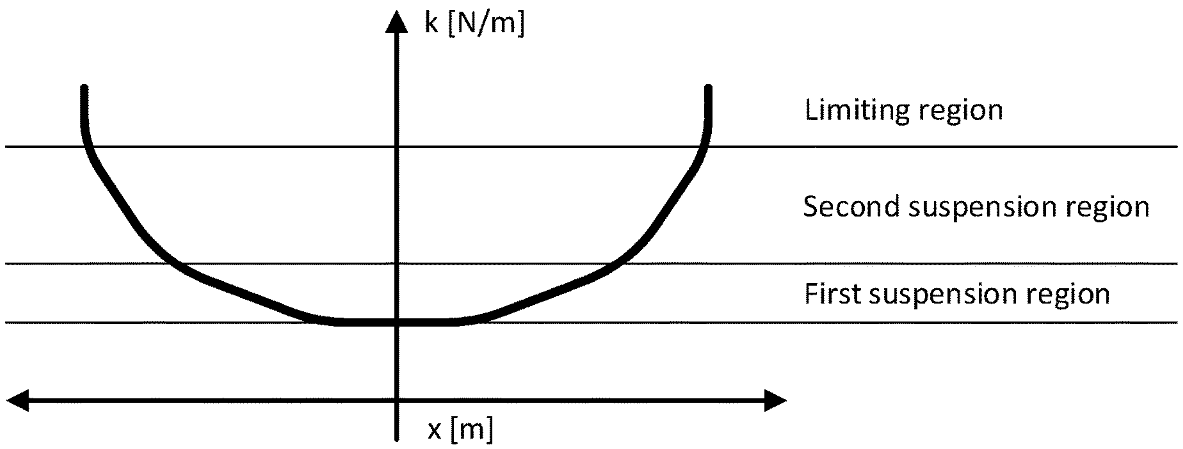
FIG. 9*a* depicts the design options of the progressivity of the secondary suspension system and FIG. 9*b* shows a graph depicting the static deflection of the secondary suspension system at varying angles of headrest recline.
Figure 9B:
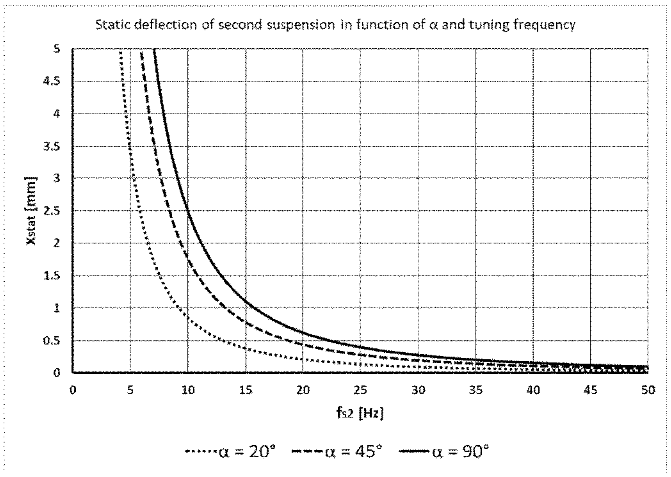
Figure 9B:
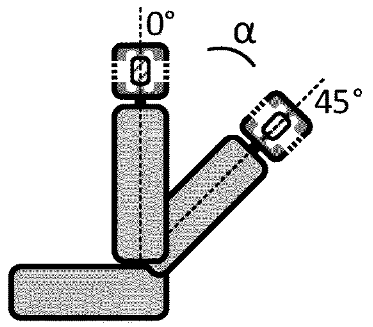

In order to optimise the stiffness of the secondary suspension system across a range of recline angles, the progressivity of the secondary suspension system can also be optimised. FIG. 9 shows an optimised profile of force against deflection. The first and second suspension regions will be defined by the vibration requirements during audio playback taking in to account the mass of the dipole loudspeaker together with the second suspension tuning frequency. The maximum seat angle and second suspension tuning frequency will define its static deflection. For instance, referring to FIG. **9*b*, a graph showing the static deflection of the second suspension system at varying angles of seat inclination is shown. From this graph it can be seen that the preferred tuning frequency of the second suspension is between 10 Hz and 20 Hz. Below 10 Hz the static deflection of the second suspension when the seat is reclined becomes quickly excessive. And above 20 Hz the vibration transmitted to the seat will quickly become excessive as can be seen from FIG. 8***b*. In FIG. 8*b* the tuning frequency of the second suspension has risen to 20 Hz due to a very progressive second suspension. It is therefore recommended to foresee a substantially linear first suspension region so that the static deflection that occurs when reclining the seat will have less effect on the tuning frequency of the second suspension and thus better capable of maintaining a good vibration reduction to the seat. The expected mechanical impact from external vibrations will preferably be used to define the progressivity and limiting region of the suspension.

Figure 10:
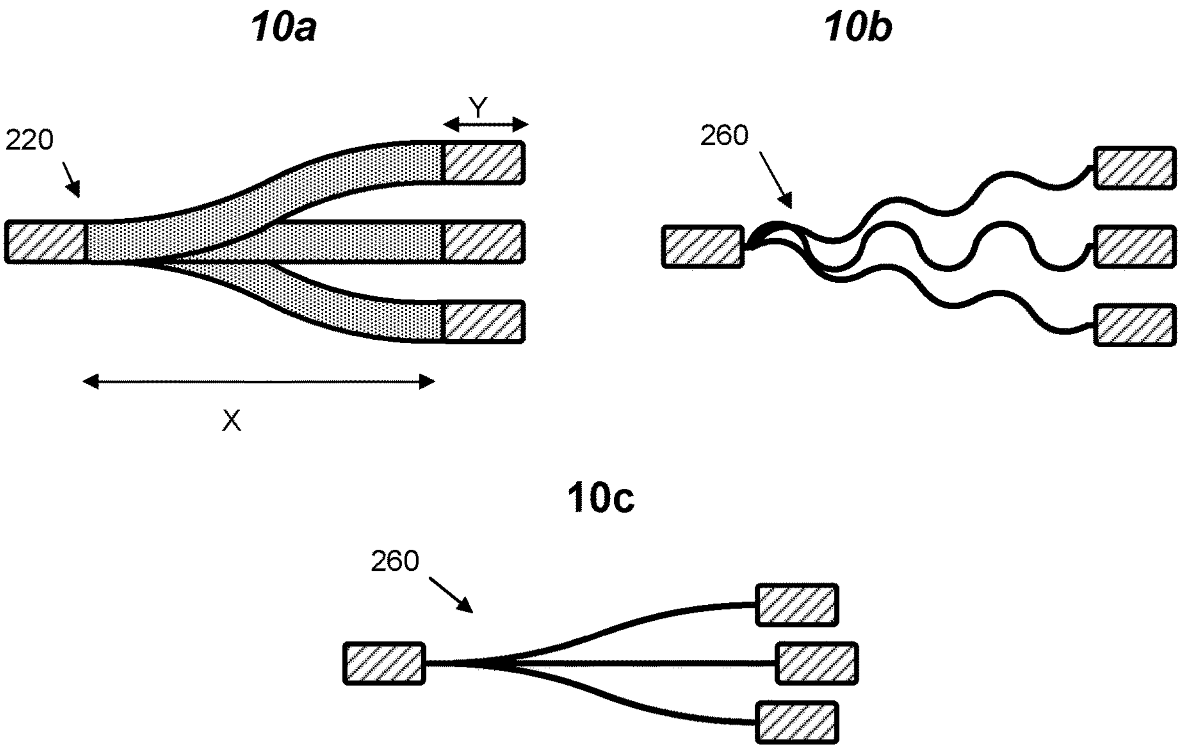
FIG. 10 depicts options for controlling the stiffness and progressivity of the attachment formations.

As described herein, the projecting element 220 can be tuned by controlling the stiffness in a number of ways. For instance, by changing the size of the projecting element. As shown in FIG. 10, a foam projecting element is shown in FIG. 10*a*. Here, the stiffness can be controlled by altering the free length X, the thickness, the density of the foam, or the inserted length Y (the inserted length Y being the length of the projecting element inserted into the corresponding attachment formation of the frame. In addition, the projecting element can be combined with other elements. For instance, in addition to or alternatively to the foam projecting element, the secondary suspension system may include a corrugated material as shown in FIG. 10*b* or a monolithic strip or sheet as shown in FIG. 10*c*. In relation to the corrugated material, the stiffness can also be controlled by the corrugation material, corrugation material thickness or size, and the corrugation pattern. In the monolithic strip or sheet, the stiffness can be controlled by the material, or the material thickness and size. Where the foam projection element 220 includes an additional element, the foam may be moulded or formed around the additional element.

Further exemplary embodiments will now be described. The further exemplary embodiments describe alternative configurations of the waveguide formation and the attachment formation and the structure of the dipole loudspeaker 100 and general configuration of the headrest 200 is not described in detail.

Figure 11:
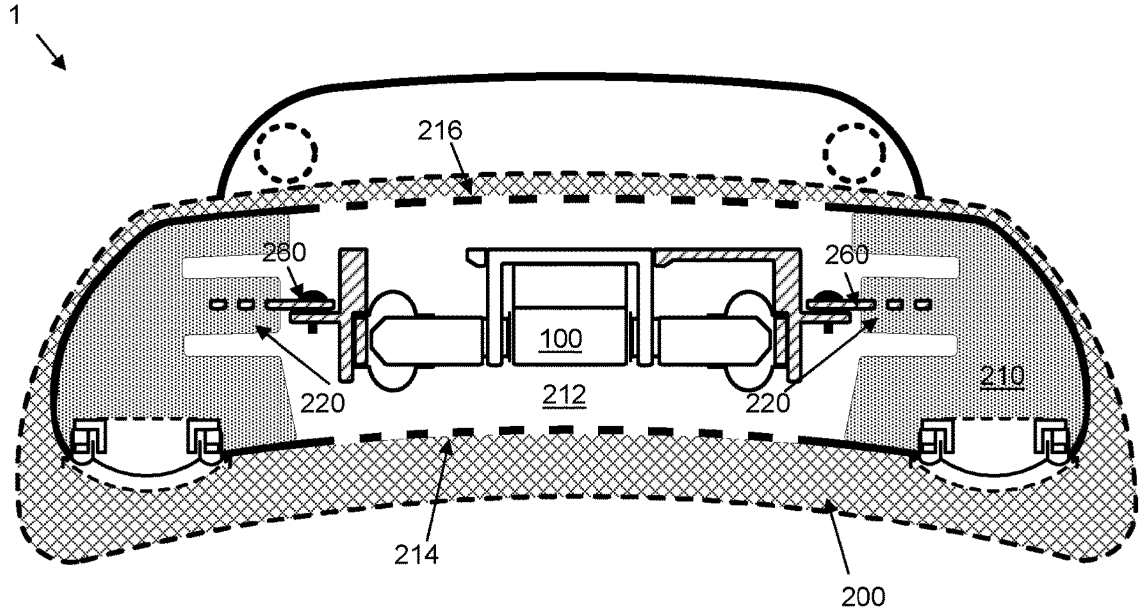
FIG. 11 shows a top view of an audio system according to a third embodiment.

FIG. 11 shows a third embodiment of an exemplary audio system 1. The dipole loudspeaker 100 is mechanically attached to the headrest. The mechanical attachment is shown as a screw, but may take other forms such as a nut and bolt or the like. The attachment formation on the headrest is shown as a projecting element 220 including an inserted component 260 (or insert) moulded therein. The projecting element 220 is formed by creating slots in the sides of the cavity in the headrest. It will be appreciated that the size of the slots can be controlled to control the stiffness of the foam projecting element. Here, the cavity is formed as an aperture through the headrest from the front to the back, the aperture forming the cavity and front and back opening. The insert 260 extends form the projecting element 220 to provide a fixing location (e.g. an aperture or thread, or screwing portion) for receiving the mechanical fixing. The projecting element in combination with the insert 260 provides the secondary suspension system. The corresponding attachment formation on the frame 110 is shown as a flange that extends around the periphery of the frame, but may also be intermittent, such as tabs at the fixing locations. Multiple fixing locations may be required as is appropriate for the suspension of the frame.

In FIG. 11, the waveguide formation function is provided by the combination of the frame and projecting element 220.

Figure 12:
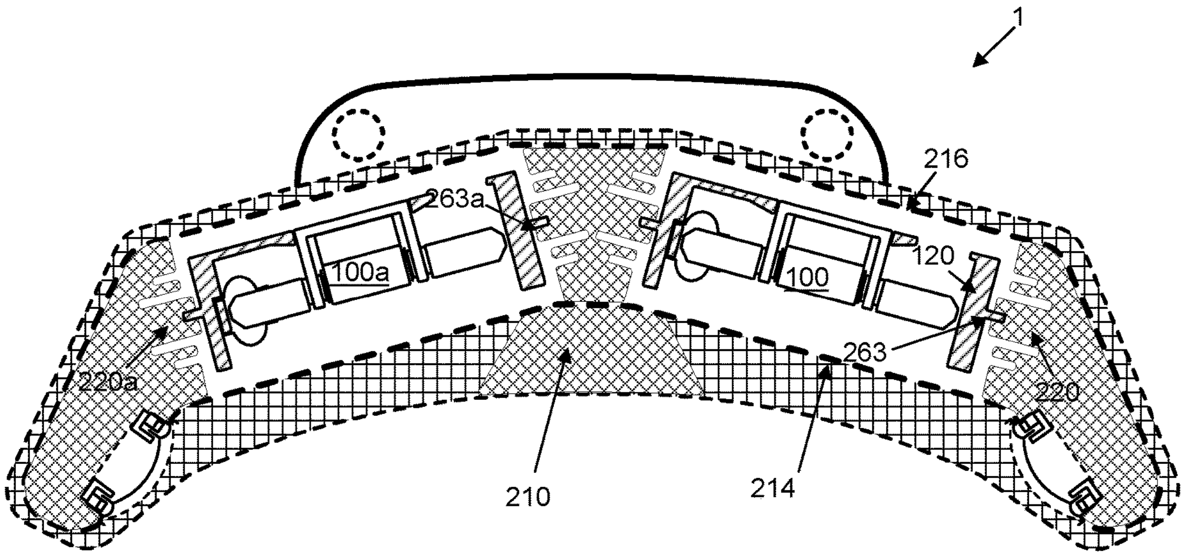
FIG. 12 shows a top view of an audio system according to a fourth embodiment.

FIG. 12 shows a further embodiment, wherein the audio system 1 includes a first dipole loudspeaker 100 and also a second dipole loudspeaker 100*a*. The second dipole loudspeaker 100*a* is substantially the same as the dipole loudspeaker 100 as herein described. Moreover, the headrest provides first and second cavities as herein described for mounting the first and second dipole loudspeakers. Each cavity include projecting elements 220 that provide the waveguide formation and the attachment formation. Here, the attachment formation is shown as a flange 263 on the frame. The flange 263 is inserted into an open cavity formed in a distal end of the projecting element 220. The flange 263 may be retained in the cavity by adhesive or may be retained by the length of the inserted distance of the flange. For instance, the projecting element may be compressed or deformed to push the flange into the cavity thereby eliminating the need for a further fixing. Also the stiffness of the projecting element 220 is controlled by a combination of parallel slots extending out from the projecting element. In FIG. 12, the waveguide formation is provided by the projecting element 220. The projecting element 220 in combination with the frame 110 combine to provide a sound baffle to guide the sound.

Figure 13:
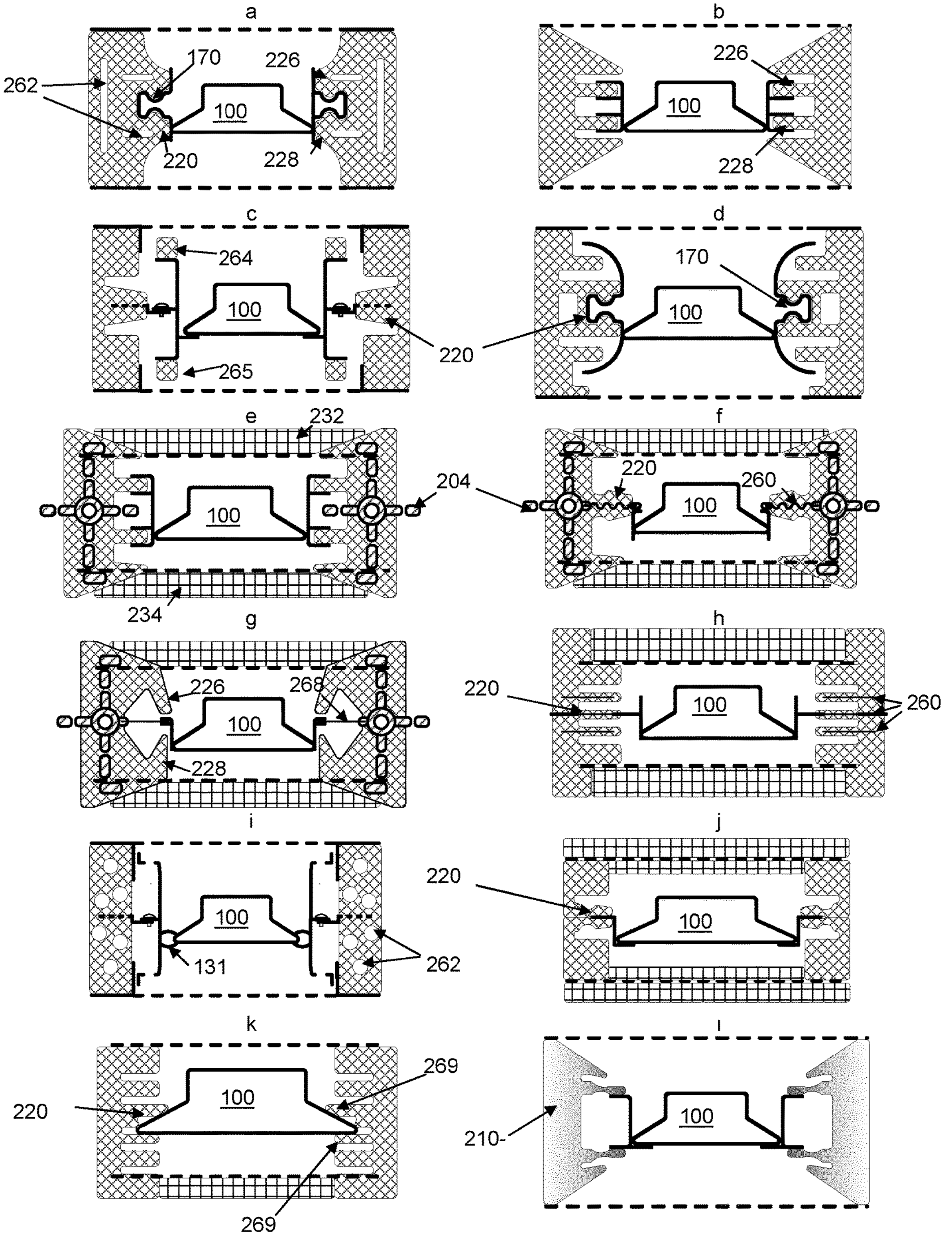
FIG. 13 shows figures a-l depicting top views of alternative designs of an audio system.

FIG. 13*a* shows the projecting element 220 formed by two projections 226, 228. The projections 226, 228 combine to form a partially enclosed cavity in which a corresponding attachment formation on the frame is inserted to mount the dipole loudspeaker in the headrest. Here, the corresponding attachment formation is shown as a profiled plate forming a projecting part 170. The projecting part is pushed into the partially enclosed cavity between the projections 226, 228. In this instance, the projections 226, 228 is designed to deflect to open the cavity to allow the projecting part 170 to enter. The attachment formation provides a snap fit as the projections 226, 228 spring back and close around the projecting part 170. In addition, the stiffness of the projecting element 220 is controlled by incorporating cavities 262 into the structural foam of the headrest. At the front side, the projection 228 provides the waveguide formation. Here, surfaces of the projection are curved to provide a smooth waveguide. In the back side, the projection 226 forms the waveguide formation. Here, the waveguide formation combines with the frame (and specifically, the profiled plate 170) to form a baffle.

FIG. 13*b* shows the projecting element 220 formed from first and second projections 226, 228. The projections are spaced a distance apart so as to increase stability of the movement. The projections 226, 228 form the attachment formation. Here, distal ends of the projections are adapted to be inserted into open cavities formed in the frame of the dipole loudspeaker 100. Here, the corresponding attachment formation on the loudspeaker 100 comprises a pair of first and second parallel flanges wherein an open cavity is formed between the first and second flanges. The foam projections 226, 228 can be pushed into the open cavities. For instance, the foam projections deflect or deform to spring into the open cavity. The dipole loudspeaker is secured to the projections by the inserted length. Projection 226 and projection 228 form the waveguide formation respectively to the rear side and the front side of the cavity formed through the headrest and in which the dipole loudspeaker is mounted. FIG. 13*e* shows a similar embodiment including the chassis and acoustically transparent inserts 232, 234.

Referring to FIG. 13*c*, the projecting element 220 forms an attachment formation similar to that of FIG. 11. However, a further foam support is provided as columns 264, 265 provided at the front and/or the back of the frame. Here, the frame is extended towards the front and back of the headrest and supported by the columns. The columns provide further suspension to assist in designing the suspension characteristics of the secondary suspension system. Moreover, the columns provide some resistance to movement of the dipole speaker in a crash situation. The projecting element 220 combines with the frame of the loudspeaker to provide a sound baffle to guide the sound from the respective vibrating surfaces and out of the front and back apertures.

In FIG. 13*d*, cavities and slots are used to define the stiffness of the projecting element 220. As shown, the corresponding attachment formation on the frame and the attachment formation on the headrest is formed by a profiled plate and pair of projections similar to the attachment formation of FIG. 13*a*. However, the profiled plate is extended at the front and back sides to extend and cover the projecting element 220. The extensions to the profiled plate are curved to provide a smooth waveguide an acoustic baffle is provided by a combination of the projecting element and the frame.

FIG. 13*f* depicts the audio system 1 wherein the projecting element 220 is reinforced with an insert. The insert is shown as a corrugated insert 260. The corrugated insert can be used to tune the stiffness of the projecting element 220.

FIG. 13*g* shows an example wherein the waveguide formation is provided by a separate component than that which provides the waveguide formation. Here, the dipole loudspeaker is attached to the headrest by a suspension element 268, shown as a monolithic sheet. The suspension 268 is separate to the foam projection element 220 and is attached to the chassis 204. Foam projections 226, 228 extend to proximity to the dipole loudspeaker to provide the waveguide formation function.

FIG. 13*h* provides a further example of using inserts 260 into the foam structure 210 to control the stiffness of the projecting foam element 220. The inserts 260 can be attached to the chassis or floating within the encapsulating foam.

FIG. 13*l* shows an example of using cavities to adapt the density of the foam and therefore the tuning frequency of the secondary suspension system. For instance, circular cavities are provided in the foam structure around the attachment formation to which the dipole loudspeaker is attached. The dipole loudspeaker 100 is further adapted to include a flexible attachment between the frame and an inner frame. Here, the diaphragm is attached to the inner frame by the first suspension system and the frame is attached to the headrest as herein described. The flexible attachment, shown as a third suspension system 131, suspends the inner frame from the frame. Providing a third (or further) suspension system can be useful to increase the design options for vibration reduction towards the seat.

In FIG. 13*j*, the attachment portion is shown as the foam projecting element 220, wherein the foam structure 210 is formed in two parts that are fixed or glued together after the dipole speaker has been assembled. The two part each include a portion of the projecting element so that the projecting element can sandwich a flange on the frame of the dipole loudspeaker when assembled.

FIG. 13*k* shows an example wherein the projecting element forming the waveguide formation is arranged to extend in front of one or both of the radiating surfaces. For instance, the foam projecting element 220 is arranged to provide an opening to the front or back opening that is more restricted than the area of the resonating surface. Thus, an overlap portion 269 is formed in between the resonating surface and the respective front or back opening.

FIG. 13*l* depicts an embodiment wherein the foam structure 210 has a graded or variable density profile (indicated by the change in grey-scale). For instance, the material forming the foam structure is created to have a variable stiffness by changing the density of the material at specific portions. For instance the distal ends of the projecting elements (shown a spaced first and second projections) may have a different density to the foam structure 210 spaced from the projections.

Figure 14:
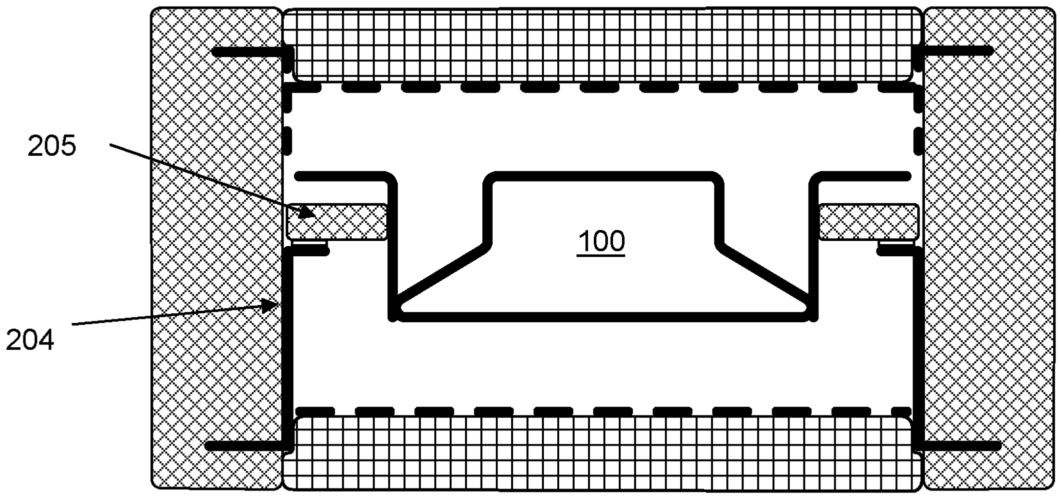
FIG. 14 shows a top view of an alternative design of an audio system.

FIG. 14 shows a further implementation of an audio system according to a further exemplary embodiment. In this exemplary embodiment the waveguide formation is formed from the chassis frame 204 of the headrest. The chassis frame 204 is rigid as it provides the structure to the headrest. As shown, a distal end of the chassis frame extends into the cavity in which the speaker is located. For instance, the distal end extends partially across the cavity to restrict the cavities size between the front and back. The distal end is shown as extending substantially orthogonal to the front to back direction of the headrest. It is envisaged that the distal end of the chassis could be a continuous flange or could be a discontinuous flange as herein described. Here, the waveguide formation includes a flexible member 205 connecting the chassis to the frame of the speaker. In this way, the flexible member 205 provides the second suspension system. In addition, the frame of the speaker extends to overlap the chassis frame 204 in a direction of the headrest (i.e. the front direction of the headrest). Here, the chassis frame provides a mechanical abutment against which the speaker would impact in the event the speaker was urged to move forward through the headrest. For instance, in the example of a vehicle, in the event of a crash, the momentum of the speaker may cause the speaker to be forced forwardly and the abutment between the speaker frame and chassis frame would provide a substantial restriction to prevent the speaker from being ejected from the headrest.

Also, as shown in FIG. 14, whilst the flexible member 205 may be integral to the headrest foam as previously described, the flexible member is suitably shown as a foam element, for instance a separate foam strip. Whilst the foam strip maybe one or more separate strips, the foam strip may also be formed in a continuous manner to extend around the periphery of the cavity as explained herein in relation to examples with integral foam. The foam strip can be glued or adhered to one side of the speaker or the headrest. For instance, in FIG. 14, the foam strip is shown as being glued or adhered to the chassis frame. A further adhesive can be activated to adhere the other side of the speaker 100 or the headrest 200 thereto. For instance, as shown in FIG. 14, a further adhesive, such as an adhesive strip, may be applied to the other side of the foam strip and the speaker frame can be pushed into contact with the adhesive to secure the speaker to the foam strip. With the speaker frame and chassis frame overlapping in a forward direction, the rigid frame provide convenient elements to press together to activate the adhesive or glue during the assembly process.

In FIG. 14, the distal end of the chassis frame is bent from a portion of the chassis frame that forms an internal surface of the cavity. Here, the chassis frame provides a substantial part of the waveguide formation. The flexible member 205 also assist in the formation of the waveguide formation. It is also envisaged that where the distal end of the chassis frame extends from headrest foam, the headrest foam may also form part of the waveguide formation as herein described.

Figure 15:
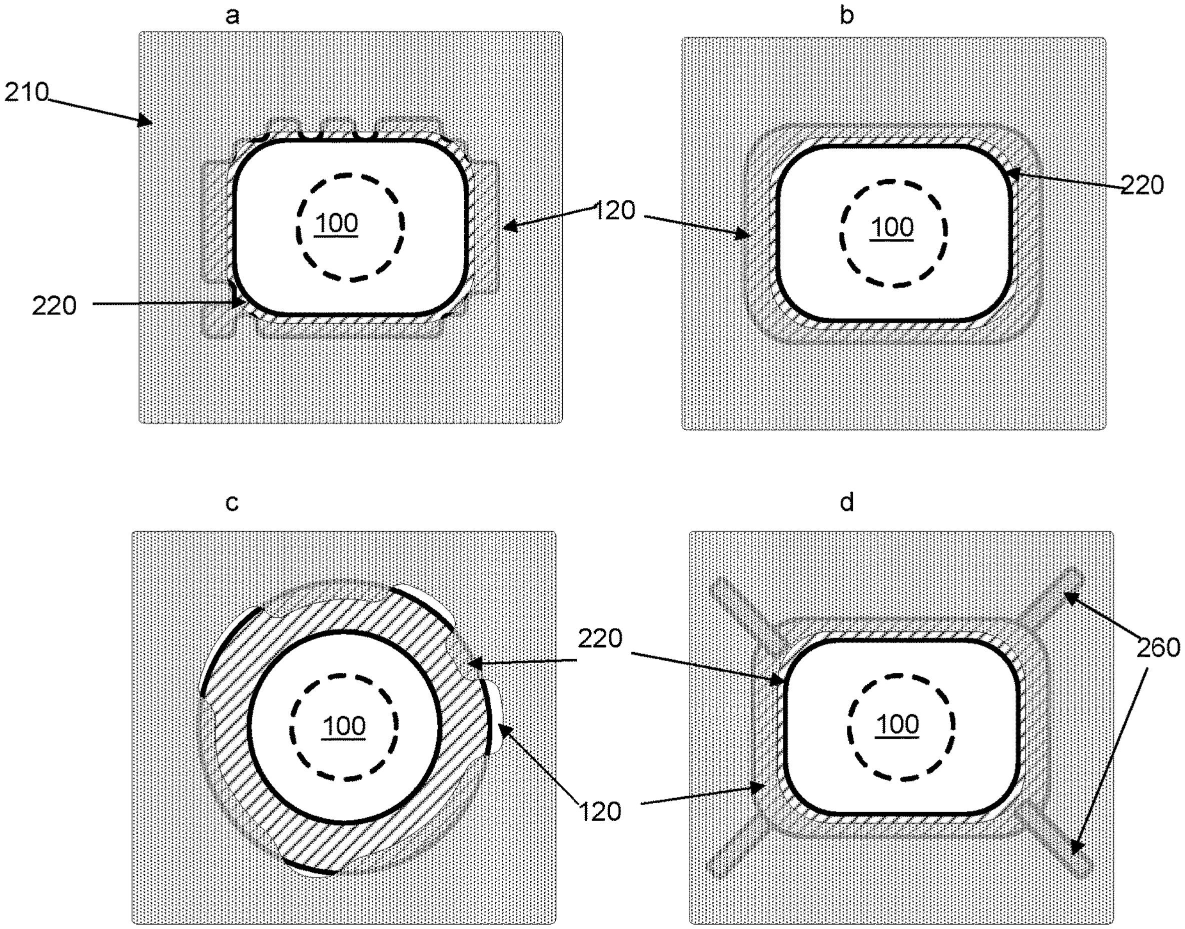
FIG. 15 shows a front view of variations a-d of the audio system.

Referring to FIG. 15, the headrest is shown from the front to depict different options for the arrangement of the attachment formation and the corresponding attachment formation of dipole loudspeaker. For instance each attachment formation extends about a periphery of the frame and cavity. However, the attachment formations may extend substantially continuously about the periphery, or alternatively may extend intermittently. As shown in FIG. 15*b*, both the attachment formation and the corresponding attachment formation extend continuously. In FIG. 15*a*, the foam projecting element 220 forming the attachment formation is continuous, whereas the corresponding attachment formation on the dipole speaker is discontinuous. FIG. 15*c* shows the opposite arrangement wherein the foam projections are discontinuous and the corresponding attachment feature on the dipole loudspeaker is continuous. FIG. 15*d* depicts a possible arrangement of the additional inserted components 260 extending radially from an approximate centre of the dipole loudspeaker. The additional components are arranged at an equal spacing around the dipole loudspeaker 100.

Figure 16:
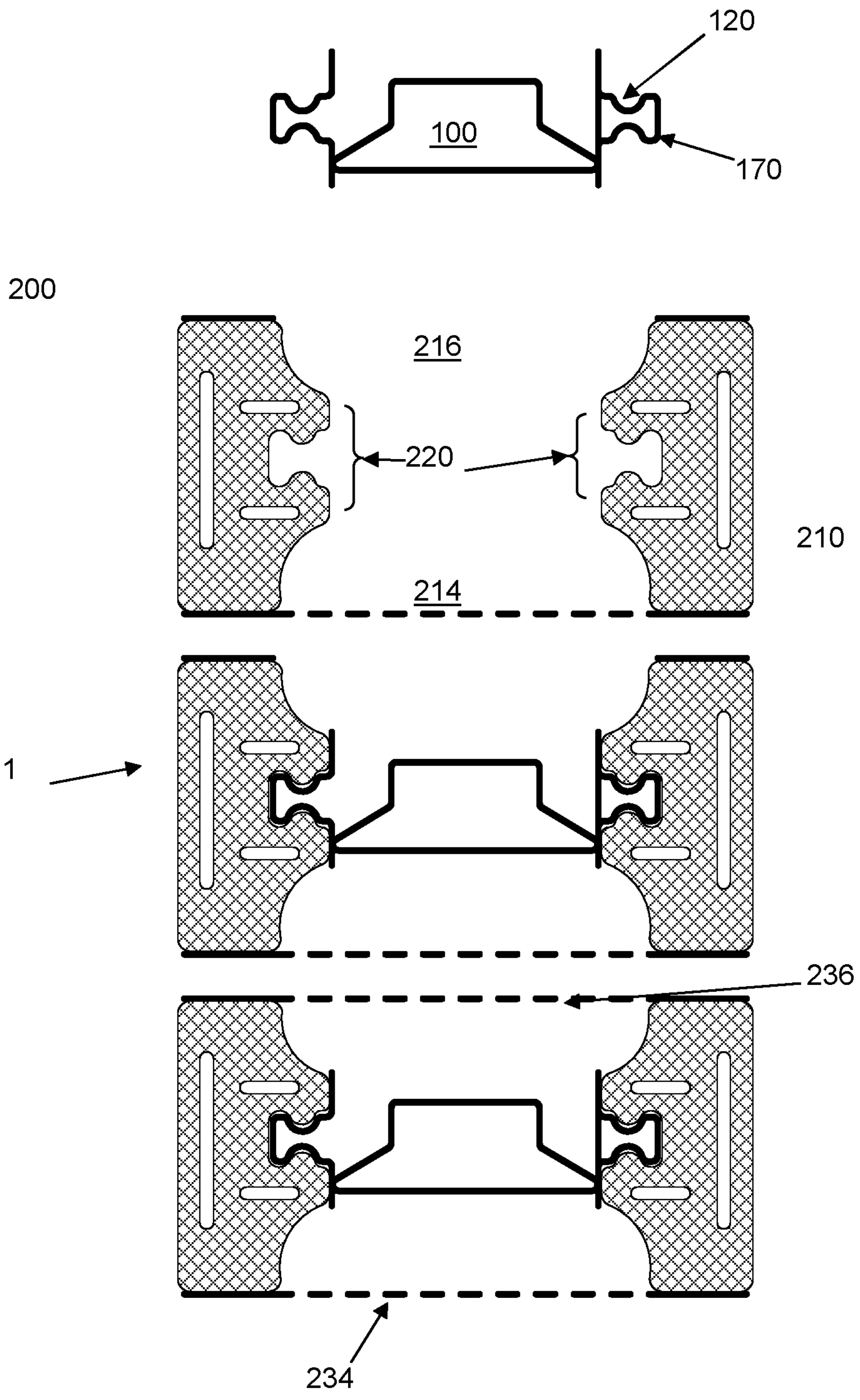
FIG. 16 shows a pictorial view of an assembly process of assembling an audio system.

Various aspects of the embodiments can be assembled through various assembly methods. But by way of example and referring to FIG. 16, the dipole loudspeaker 100 is pushed into the headrest 200. The dipole loudspeaker is shown as being pushed through the back opening 216, but this is not limiting and it can also be pushed through the front opening 214. The attachment formation is caused to engage or cooperate with the attachment formation on the headrest, for instance by pushing a projection on one of the parts (shown as a projection formed by a profiled plate on the frame of the dipole loudspeaker) in to a cavity on the other part (shown as a partially enclosed cavity formed between two foam projections on the foam structure 210). In one embodiment, the projections deform or deflect when the dipole loudspeaker 100 is pushed into the headrest 200. The projections spring back once the projection is inserted to snap fit the dipole speaker into the headrest. Once the dipole loudspeaker is installed in the foam structure 210, further components of the main body assembly can be installed such as the acoustically transparent infill pieces 232, 234. Some of further components of the headrest may be installed prior to assembling the dipole loudspeaker, for instance the chassis and other inserts and or any other audible components.

The audio system 1 herein described provides a dipole loudspeaker for creating bass frequencies in a personal sound cocoon around the headrest. Advantageously, the path length of the dipole loudspeaker between the two vibrating surfaces can be extended to increase the SPL within the personal sound cocoon. Furthermore, by incorporating the function of the secondary suspension system into foam projections, the audio system can be assembled with fewer parts without necessarily noticeably increasing the number or cost of the components of the headrest. The audio system 1 can be incorporated into a seat and in turn the seat in to a vehicle or the like.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. An audio system comprising a dipole loudspeaker and a headrest;

the dipole loudspeaker includes: a diaphragm having a first radiating surface and a second radiating surface, wherein the first radiating surface and the second radiating surface are located on opposite faces of the diaphragm; a drive unit configured to move the diaphragm at bass frequencies such that the first and second radiating surfaces produce sound at bass frequencies, wherein the sound produced by the first radiating surface is in antiphase with sound produced by the second radiating surface; a loudspeaker frame, wherein the diaphragm is suspended from the loudspeaker frame via a primary suspension system; and the headrest includes:

a main body assembly shaped to include a first opening configured to allow sound produced by the first radiating surface to propagate out of a first side of the headrest, and a second opening configured to allow sound produced by the second radiating surface to propagate out of a second side of the headrest, wherein the main body assembly includes a foam structure, wherein the foam structure is acoustically resistive; and a projecting element formed of acoustically resistive foam, which extends between the foam structure of the headrest and the loudspeaker frame, wherein the projecting element provides:

a waveguide formation which is configured to direct sound produced by the first radiating surface out of the first opening, and to direct sound produced by the second radiating surface out of the second opening as a result of the projecting element and the loudspeaker frame combining to form an acoustic baffle; and an attachment formation which is used to attach the loudspeaker frame to the headrest, wherein the attachment formation provides a secondary suspension system via which the loudspeaker frame is suspended.

2. The audio system of claim 1, wherein the projecting element is formed integrally with the foam structure of the headrest.

3. The audio system of claim 1, wherein the projecting element includes a distal end for attaching to a corresponding attachment formation on the loudspeaker frame and a stiffness of the projecting element being adapted to provide the secondary suspension system to suspend the loudspeaker frame.

4. The audio system of claim 3, wherein the projecting element includes an inserted component, the inserted component extending at least partially along a length of the projecting element to alter the stiffness of the projecting element.

5. The audio system of claim 4, wherein the inserted component extends from the distal end of the projecting element, and the loudspeaker frame is attached to the inserted component.

6. The audio system of claim 1, wherein the audio system is incorporated in a seat.

7. The audio system of claim 6, wherein the seat is incorporated in a vehicle.

8. A method of assembling an audio system, wherein the method comprises assembling a dipole loudspeaker to a headrest;

wherein the headrest includes:

a main body assembly shaped to include a first opening configured to allow sound produced by the first radiating surface to propagate out of a first side of the headrest, and a second opening configured to allow sound produced by the second radiating surface to propagate out of a second side of the headrest, wherein the main body assembly includes a foam structure, wherein the foam structure is acoustically resistive; and a projecting element formed of acoustically resistive foam, which extends between the foam structure of the headrest and the loudspeaker frame, wherein the projecting element provides:

a waveguide formation which is configured to direct sound produced by the first radiating surface out of the first opening, and to direct sound produced by the second radiating surface out of the second opening as a result of the projecting element and the loudspeaker frame combining to form an acoustic baffle; and an attachment formation;

wherein the dipole loudspeaker includes:

a diaphragm having a first radiating surface and a second radiating surface, wherein the first radiating surface and the second radiating surface are located on opposite faces of the diaphragm; a drive unit configured to move the diaphragm at bass frequencies such that the first and second radiating surfaces produce sound at bass frequencies, wherein the sound produced by the first radiating surface is in antiphase with sound produced by the second radiating surface; and a loudspeaker frame, wherein the diaphragm is suspended from the frame via a primary suspension system; wherein the loudspeaker frame is specifically adapted to include a corresponding attachment formation for attaching the loudspeaker frame to the attachment formation of the headrest;

wherein the method comprises:

moving the dipole loudspeaker relative to the headrest to cause the attachment formation of the headrest to couple to the corresponding attachment formation of the loudspeaker frame so that the attachment formation provides a secondary suspension system via which the loudspeaker frame is suspended.

9. The audio system of claim 1, wherein the headrest includes multiple projecting elements which extend between the foam structure and the loudspeaker frame, and wherein the one or more projecting elements close any gaps between the headrest main body and the frame of the dipole speaker so as to inhibit sound travelling between the first and second radiating surfaces through the headrest.

10. The audio system of claim 2, wherein the dipole loudspeaker comprises an open cavity which receives the projecting element formed integrally with the foam structure of the headrest.

11. The audio system of claim 1, wherein the projecting element is attached to the loudspeaker frame.

12. The audio system of claim 1, wherein the loudspeaker frame is specifically adapted to include a corresponding attachment formation for attaching the loudspeaker frame to an attachment formation of the headrest.

13. The audio system of claim 12, wherein the corresponding attachment formation is a projection formed on the loudspeaker frame.

14. The audio system of claim 12, wherein the corresponding attachment formation is a cavity formed on the loudspeaker frame.

* * * * *